United States Patent [19]
Matsumoto et al.

[11] Patent Number: 5,768,730
[45] Date of Patent: Jun. 23, 1998

[54] DRUM TYPE WASHING MACHINE AND DRYER

[75] Inventors: Tsuyoshi Matsumoto, Kitakatsuragi-gun; Hiroko Tanaka, Sakai; Masanobu Tanigawa, Takatsuki, all of Japan

[73] Assignee: Sharp Kabushiki Kaisha, Osaka, Japan

[21] Appl. No.: 565,243

[22] Filed: Nov. 30, 1995

[30] Foreign Application Priority Data

| Dec. 6, 1994 | [JP] | Japan | 6-301874 |
| Jul. 31, 1995 | [JP] | Japan | 7-194779 |
| Aug. 29, 1995 | [JP] | Japan | 7-220376 |
| Aug. 30, 1995 | [JP] | Japan | 7-221491 |

[51] Int. Cl.$^6$ .................................................. D06F 37/22
[52] U.S. Cl. ............................... 8/159; 68/12.06; 68/23.2; 210/144
[58] Field of Search ................. 68/12.06, 23.2, 68/23.1; 8/159; 210/144; 74/573 F; 494/82

[56] References Cited

U.S. PATENT DOCUMENTS

| 1,948,568 | 2/1934 | Faber et al. |
| 2,357,909 | 9/1944 | Ridge |
| 2,463,801 | 3/1949 | Page ............................................. 68/23.2 |
| 2,984,094 | 5/1961 | Belaieff ........................................ 68/23.2 |
| 3,583,182 | 6/1971 | Matsuura |
| 3,674,419 | 7/1972 | Tichy ........................................... 68/12.06 |
| 4,411,664 | 10/1983 | Rickard et al. ........................... 68/12.06 |
| 4,489,574 | 12/1984 | Spendel |
| 4,580,421 | 4/1986 | Babuin et al. |
| 4,603,489 | 8/1986 | Goldberg |
| 4,765,161 | 8/1988 | Williamson ............................... 68/12.06 |
| 4,856,301 | 8/1989 | Broadbent |
| 5,107,603 | 4/1992 | Durazzani |
| 5,115,651 | 5/1992 | Nukaga et al. |
| 5,301,522 | 4/1994 | Ikemizu et al. ........................... 68/12.06 |
| 5,345,792 | 9/1994 | Farrington et al. ....................... 68/23.2 |

FOREIGN PATENT DOCUMENTS

| 0146719 | 7/1985 | European Pat. Off. |
| 2311883 | 12/1976 | France |
| 1953201 | 4/1970 | Germany |
| 2746989 | 4/1978 | Germany |
| 3017109 | 11/1981 | Germany |
| 58-130089 | 8/1983 | Japan |
| 61-234897 | 10/1986 | Japan |
| 2147097 | 6/1990 | Japan |
| 2255191 | 10/1990 | Japan |
| 3-86197 | 4/1991 | Japan ................................. 68/12.06 |

Primary Examiner—Frankie L. Stinson

[57] ABSTRACT

A drum type washing machine includes a plurality of injection nozzles for linearly injecting a washing liquid toward laundry in a drum which is rotatable about a horizontal shaft. The drum type washing machine includes decision unit for deciding an amplitude of vibration which is detected based on vibration detected at a predetermined low rotation speed and a controller for controlling a drive unit that applies a driving force of forward/reverse rotation to a drum to correct localization of laundry in the drum. A drum type dryer includes a refrigerating cycle provided to an air-circulating line between a discharge port and a hot air supply port of a drum, and performs air-conditioning of outer air. A drum type washing machine includes a controller for controlling a drive unit to rotate a drum once or the plural number of times at a high speed to dehydrate laundry heated by hot air in an initial period of drying.

29 Claims, 22 Drawing Sheets

DRYING MODE

COOLING MODE

HEATING MODE

DEHUMIDIFYING MODE

DRUM TYPE WASHING MACHINE AND DRYER

BACKGROUND OF THE INVENTION (1) Field of the Invention

The present invention relates to a drum type washing machine in which laundry is accommodated in a drum which is driven to rotate about a horizontal shaft and which performs washing to dehydration, and a drum type washing machine which performs washing to drying. Also, the present invention relates to a drum type drier which performs air conditioning, in addition to drying clothing, by a refrigerating cycle.

(2) Description of the Background Art

In a conventional drum type washing machine, a drum is rotated in a water tank about a horizontal shaft, so that washing, rinsing, and dehydration of laundry are performed by tumbling. Japanese Patent Application Laid-open Sho 58 No.130089 discloses a washing machine of this type, in which washing can be efficiently performed with a small amount of water. According to this washing machine, a spray nozzle is provided to the opening portion of the inlet port of a stationary drum to spray a thick aqueous cleaning liquid and an aqueous rinsing liquid to the laundry. The cleaning liquid and the rinsing liquid are sprayed from the spray nozzle to the laundry in a movable drum.

When the spray nozzle is provided at the opening portion of the inlet port of the stationary drum, as described above, the laundry can be caught by the spray nozzle during loading/unloading the laundry. When the spray nozzle is provided in a non-projecting manner, although the laundry is not caught thereby, the direction to spray the cleaning liquid is restricted, and the cleaning liquid is sprayed to the laundry only within a small area. As a result, a sufficiently high detergency cannot be obtained, leading to non-uniform cleaning. Also, in the conventional technique described above, the cleaning liquid used for washing is discharged from the lowermost portion of the stationary drum and flowed to a sewer. Thus, economization of water is not effectively performed.

According to another example of the conventional drum type washing machine, a liquid balancer is provided to the drum to suppress vibration occurring during dehydration, as described in Japanese Patent Application Laid-open Hei 2 No.255191. However, in the drum type washing machine in which the drum rotates horizontally, water or salt water sealed in the liquid balancer tends to rotate by inertial force and to flow downward under gravity simultaneously. In particular, when rotation of the drum obtained during washing, rinsing or drying is as low as about 40 to 60 rpm, the action of gravity becomes larger than the action to rotate by inertial force, so that the liquid constantly flows, thereby generating flowing noise. Also, the liquid is concentrated on the lower portion due to the action of gravity, thereby increasing the unbalance.

In the drum type washing machine, as the temperature in the drum reaches about 60° C. to 100° C., the liquid sealed in the liquid balancer is evaporated, causing liquid leakage or degradation in performance due to the increase in internal pressure.

Although the liquid balancer serves to decrease unbalance of rotation of the drum, it does not solve localization of the loaded laundry that causes unbalance. Thus, the liquid balancer is not effective for a large unbalance.

In the drum type washing machine described above, although the liquid balancer serves to decrease unbalance, it does not positively correct localization of the loaded laundry that causes unbalance. Thus, when the rotation speed is low, the liquid balancer cannot enhance its effect of vibration decrease. Thus, a fundamental resolution cannot be obtained.

As the liquid sealed in the liquid balancer has a low boiling point of about 100° C., it can be easily evaporated during the drying operation. Also, as the liquid sealed in the liquid balancer has a low viscosity, it constantly flows when the drum rotates at a low speed, causing annoying noise of the flow.

In general, in a clothing dryer, a drum accommodating clothing to be dried is rotated about a horizontal shaft, and hot air heated by an electric heater in the drum or by burning gas is supplied simultaneously, thereby drying the clothing. This high-temperature high-humidity air after drying is directly discharged to outside the drum. Alternatively, the exhaust air is air-cooled by natural air, is dehumidified by heat exchange, and is then returned to the heater by circulation.

In this clothing dryer, in order to shorten the drying time, generally, the capacity of the heater is increased, or the air capacity is increased. However, to increase the capacity of the heater is not preferable in terms of the power consumption amount or the power capacity of the house wiring. When the air capacity is simply increased, the hot air heat source constituted by a Nichrome wire heater causes a decrease in temperature of the hot air with an increase in air capacity, thus not contributing much to promotion of drying. Also, if the hot air heat source is a PTC heater, as the air capacity is increased, the power consumption is increased.

An idea of utilizing the refrigerating cycle of an air-conditioner to a clothing dryer has also been proposed. Concerning this, an arrangement in which laundry is dried by supplying hot air discharged from an outdoor unit to the laundry is described in Japanese Patent Application Laid-open Hei 2 No.147097.

However, in the clothing dryer described in Japanese Patent Application Laid-open Hei 2 No.147097, as high-temperature air generated by the outdoor unit while cooling the room is used for drying the clothing, this clothing dryer has low cost-performance. Also, not only both the indoor and outdoor units are excessively large, but also a clothing drying chamber is separately needed. Then, a large installation space is needed, and installation of the clothing drying chamber is considerably restricted.

Furthermore, in a conventional integral-type dryer/washing machine which performs washing to drying, after the laundry is loaded from the laundry loading port, a detergent and water are supplied in accordance with the weight of the laundry, and washing is performed. Then, the washing water is discharged and dehydration is performed. Subsequently, water is supplied to perform rinsing. After dehydration, the laundry is heated by a heater, thereby drying the laundry.

The air heated by the heater is supplied into the drum through an opening portion above the loading port of the integral-type dryer/washing machine, heats the laundry, and also deprives water contained in the laundry. The obtained high-temperature high-humidity air is guided to a duct, is condensed into low-temperature high-humidity air by cold water supplied from above the duct, and is drawn by a fan to be delivered toward the drying heater. The delivered air is heated by the drying heater to become high-temperature low-humidity air, and is then blown into the drum through a hot air supply port.

In the integral-type conventional dryer/washing machine described above, to wash and dry laundry weighing 2 kg, as long as a total of 162 minutes, i.e., 72 minutes for washing and 90 minutes for drying, is required. Japanese Patent Application Laid-open Sho 61 No.234897 proposes an idea in which the dehydration rate is increased by taking in hot air discharged from a clothing dryer into the dehydrating tank of a two-tub washing machine. However, this proposal is not practical.

SUMMARY OF THE INVENTION

It is an object of the present invention to provide a drum type washing machine in which a cleaning liquid is efficiently injected with a simple structure to uniformly clean laundry.

It is another object of the present invention to provide a drum type washing machine in which vibration of the drum is decreased and localization of the laundry loaded in the drum is corrected.

It is still another object of the present invention to provide a drum type dryer capable of increasing efficiency in clothing drying and air-conditioning near a place where the dryer is installed.

It is still another object of the present invention to provide a drum type washing machine capable of shortening drying time, thus achieving energy savings.

Therefore, according to an aspect of the present invention, there is provided a drum type washing machine which comprises: a drum for accommodating laundry, and the drum having a plurality of holes and a baffle for tumbling the laundry at a circumferential wall thereof; a water tank for supporting the drum to be rotatable about a horizontal shaft, and the water tank surrounding the drum entirely; a drive unit for applying a driving force of forward/reverse rotation to the drum; a plurality of injection nozzles for linearly injecting a washing liquid to the laundry in the drum; and an injection unit for supplying the washing liquid to the injection nozzles.

With the above arrangement, a large impact area washing liquid can be applied to the laundry, and uniform distribution of the washing liquid, in particular, the cleaning liquid, into the laundry is promoted. Since cleaning is performed by tumbling, the detergency can be improved.

It is effective for the above drum type washing machine to have mixer for mixing air in the washing liquid to be injected from the plurality of injection nozzles. More specifically, when the pressure of the injection liquid changes, the impact on the laundry can be further increased, so that permeation of the washing liquid into the laundry is promoted, thereby improving the detergency.

It is preferable that the plurality of injection nozzles be mounted to the baffle provided on the inner circumferential wall of the drum. Since the washing liquid is injected to the laundry over a short distance, a large impact and permeation power can be obtained, thereby improving the detergency.

It is effective for the above drum type washing machine to have a rotation controller means for controlling the drive unit to change a rotation speed of the drum during washing. Agitation of the laundry is promoted and the laundry can be crumpled and relieved, so that the washing liquid permeates well. The impact caused by tumbling after the permeation is increased, so that non-uniform cleaning can be eliminated and the cleaning time can be shortened.

It is effective for the above drum type washing machine to have a tank for storing the washing liquid discharged from the water tank, and a volume-detector for detecting a volume of the laundry based on an amount of water supplied to the water tank and an amount of water stored in the tank. The amount of the laundry can be easily detected within a short period of time, the laundry can be cleaned with an appropriate amount of water and an appropriate amount of detergent in accordance with the amount of the laundry. Economization of water and detergent can be achieved. A high detergency can be obtained regardless of the amount of the laundry, and damage to the laundry can be prevented.

It is preferable that the plurality of injection nozzles be disposed in a staggered manner in the direction of the rotational axis of the drum. The number of injecting lines for the washing liquid is increased, so that the washing liquid is uniformly and effectively injected to the laundry, thereby increasing the cleaning effect.

It is preferable that the volume mixing ratio of the washing liquid to air that is mixed by the mixer be set to about 1:1. The impact of the washing liquid on the laundry is increased, thereby increasing the cleaning effect.

Alternatively, the above drum type washing machine may have a regulating valve for regulating the volume mixing ratio to about 1:1. Then, the best cleaning effect can be always maintained.

It is effective for the above drum type washing machine to have a foam height-detector for detecting the height of foam of the washing liquid, an anti-foaming unit for adding an anti-foaming agent to the washing liquid, and controller for controlling the anti-foaming unit to add the anti-foaming agent to the washing liquid based on a signal sent from the foam height-detector. Then, the cleaning effect is increased regardless of the employed detergent, and foam leakage and the like can be prevented. When a heater, a fan, and the like are incorporated as the anti-foamer means in the washing liquid circulating line, a large space is required, and electrical leakage may occur. Since the detergent employed by the drum type washing machine is limited to a low-foaming detergent, if a high-foaming detergent is erroneously introduced, the foam may leak through the seal portion of the window in the front surface of the washing machine, or the foam serves as a cushion, thereby decreasing the cleaning effect. However, these problems are solved in the present invention.

According to another aspect of the present invention, there is provided a drum type washing machine which comprises: a drum for accommodating laundry, and the drum having a plurality of holes and a baffle for tumbling the laundry at a circumferential wall thereof; a water tank for supporting the drum to be rotatable about a horizontal shaft, and the water tank surrounding the drum entirely; a drive unit for applying a driving force of forward/reverse rotation to the drum; a vibration-detector means for detecting vibration of the water tank; a decision unit for deciding the amplitude of vibration detected by the vibration-detector means at a predetermined low rotation speed at which vibration substantially proportional to vibration of the drum in high-speed rotation is obtained; and a controller for controlling the drive unit to correct localization of the laundry in the drum. Then, vibration in high-speed dehydration can be predicted. When the vibration is large, localization of the laundry can be corrected, thereby increasing the effect of decreasing vibration.

When the amplitude of the vibration decided by the decision unit at the predetermined low rotation speed at which the vibration substantially proportional to vibration of the drum in high-speed rotation is obtained is a predetermined value or less, the controller controls the drive unit to rotate the drum at a higher speed. More specifically, the amplitude of the vibration is determined in low-speed rotation. The drum is shifted to a high-speed rotation mode (dehydration) only when a small vibration is predicted. Thus, the probability of low vibration is increased.

When the amplitude of the vibration decided by the decision unit exceeds a predetermined value at any rotation speed not more than the predetermined low rotation speed, the controller controls the drive unit to temporarily stop rotation of the drum and then to rotate the drum in a reverse direction, so that localization of the laundry is corrected, and when the amplitude of the vibration decided by the decision unit exceeds a vibration limit value at any rotation speed including that of high-speed rotation, the control unit controls the drive unit to temporarily stop rotation of the drum, so that localization of the laundry is corrected. More specifically, when the vibration is large, rotation of the drum is temporarily stopped, and the drum is rotated in the reverse direction, so that the laundry is disentangled, thereby effectively correcting localization of the laundry. When the amplitude of the vibration exceeds a predetermined value in any mode including high-speed rotation, rotation of the drum is stopped, so that abnormal vibration can be prevented, thereby increasing safety.

The vibration-detector comprises a vibration sensor which is provided to the water tank and detects a horizontal or vertical component of vibration occurring in the rotational direction of the drum. Then, a component that most influences vibration of the floor where the drum type washing machine is placed can be effectively detected.

It is preferable that the drum have a liquid balancer in which a high-boiling viscous liquid is sealed. More specifically, when a liquid having a high boiling point is sealed to obtain a liquid balancer, an increase in internal pressure of the liquid balancer can be suppressed, leading to a liquid balancer which is suitable for a high-temperature operation as well. When a liquid balancer is obtained by sealing a highly viscous liquid, the flow of the liquid becomes slow, so that annoying noise of the flow is eliminated, leading to a quiet liquid balancer.

It is preferable that the viscous liquid be glycerin or a diluted glycerin solution. Then, the characteristics described above can be obtained, leading to a highly safe balancer at a comparatively low cost.

It is preferable that the viscous liquid be injected and sealed in the liquid balancer under reduced pressure. More specifically, the liquid is sealed by setting the hollow annular liquid balancer under reduced pressure. Thus, even if the liquid balancer is heated to a high temperature, an increase in internal pressure of the liquid balancer can be suppressed, leading to a liquid balancer which is suitable for a high-temperature operation as well.

It is further preferable that the viscous liquid be injected and sealed in the liquid balancer such that, assuming that an internal pressure of the liquid balancer at a high temperature satisfies (atmospheric pressure+$P_3$), the internal pressure of the liquid balancer at room temperature satisfies (atmospheric pressure−$P_1$), wherein $P_1$ is the vapor pressure of the viscous liquid. Therefore, the margin of a decrease in the internal pressure of the liquid balancer at room temperature can be almost set equal to the margin of an increase in the internal pressure of the liquid balancer at high temperature, so that a difference between the internal and external pressures can be minimized, thereby minimizing the danger of liquid leakage.

According to still another aspect of the present invention, there is provided a drum type dryer capable of performing air-conditioning of outer air which comprises: a drum for accommodating laundry, and the drum having a baffle for tumbling the laundry at a circumferential wall thereof and being rotatable about a horizontal shaft; a drive unit for applying a driving force of forward/reverse rotation to the drum; a heating unit for heating air supplied into the drum; and a refrigerating cycle having a refrigerant-compressing section, a heating section, a refrigerant-expanding section and a cooling/dehumidifying section, wherein the heating section and the cooling/dehumidifying section of the refrigerating cycle are provided to an air-circulating line between a discharge port and a hot air supply port of the drum. With this arrangement, the efficiency of clothing drying can be increased, and air condition in a place near a place where the clothing dryer is installed can be achieved.

It is effective for the above drum type dryer to have an outlet port for exhausting air-conditioned outer air to the outside of the dryer, and the outlet port being continuously connected to the air-circulating line, and a switch for switching the flow of air to the hot air supply port or the outlet port, and the switch being provided to the air-circulating line. Air-conditioned air can be delivered to the outside of the dryer through the outlet port by driving the refrigerating cycle, so that the place, e.g., a dressing or washing room, where the dryer is installed can be air-conditioned, thereby remarkably improving the environment of the work place. Furthermore, air-conditioning can be performed while utilizing the drying function. The function can be improved without complicating the structure of the dryer. Dehumidified air can be positively generated to increase the efficiency of clothing drying, thereby shortening time required for drying the clothing.

It is preferable for the above drum type dryer to have a controller for controlling the switch to guide air in the drum to the hot air supply port through the cooling/dehumidifying section and the heating section of the refrigerating cycle in a washing drying mode, to guide outer air to the outlet port through the cooling/dehumidifying section of the refrigerating cycle in a cooling mode, to guide outer air to the outlet port through the heating section of the refrigerating cycle in a heating mode, and to guide outer air to the outlet port through the cooling/dehumidifying section and the heating section of the refrigerating cycle in a dehumidifying mode.

According to still another aspect of the present invention, there is provided a drum type washing machine which comprises: a drum for accommodating laundry, and the drum having a plurality of holes and a baffle for tumbling the laundry at a circumferential wall thereof; a water tank for supporting the drum to be rotatable about a horizontal shaft, and the water tank surrounding the drum entirely; a drive unit for applying a driving force of forward/reverse rotation to the drum; a heating unit for heating air to be supplied into the drum; and controller for controlling the drive unit to rotate the drum once or a plural number of times at a high speed to dehydrate the laundry heated by hot air in an initial period of drying.

After high-speed rotational dehydration, the controller controls the drive unit to stop the drum for a predetermined period of time or to stop the drum for a predetermined period of time and thereafter rotate the drum at a low speed in a reverse direction so that the laundry stuck to the drum is separated therefrom.

According to the above arrangement, the drying time can be shortened with a simple method of rotating the drum at a high speed at the initial stage of drying/heating operation. Since the drum need only be rotated at a high speed at the initial stage of drying/heating operation, a load will not be easily applied to the drum-rotating motor and the like. After high-speed rotation, if the drum is kept stopped for a little while and is then rotated in the reverse direction for a short period of time, the clothing will not stick to the drum, thereby drying the clothing efficiently.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

Figure 1:
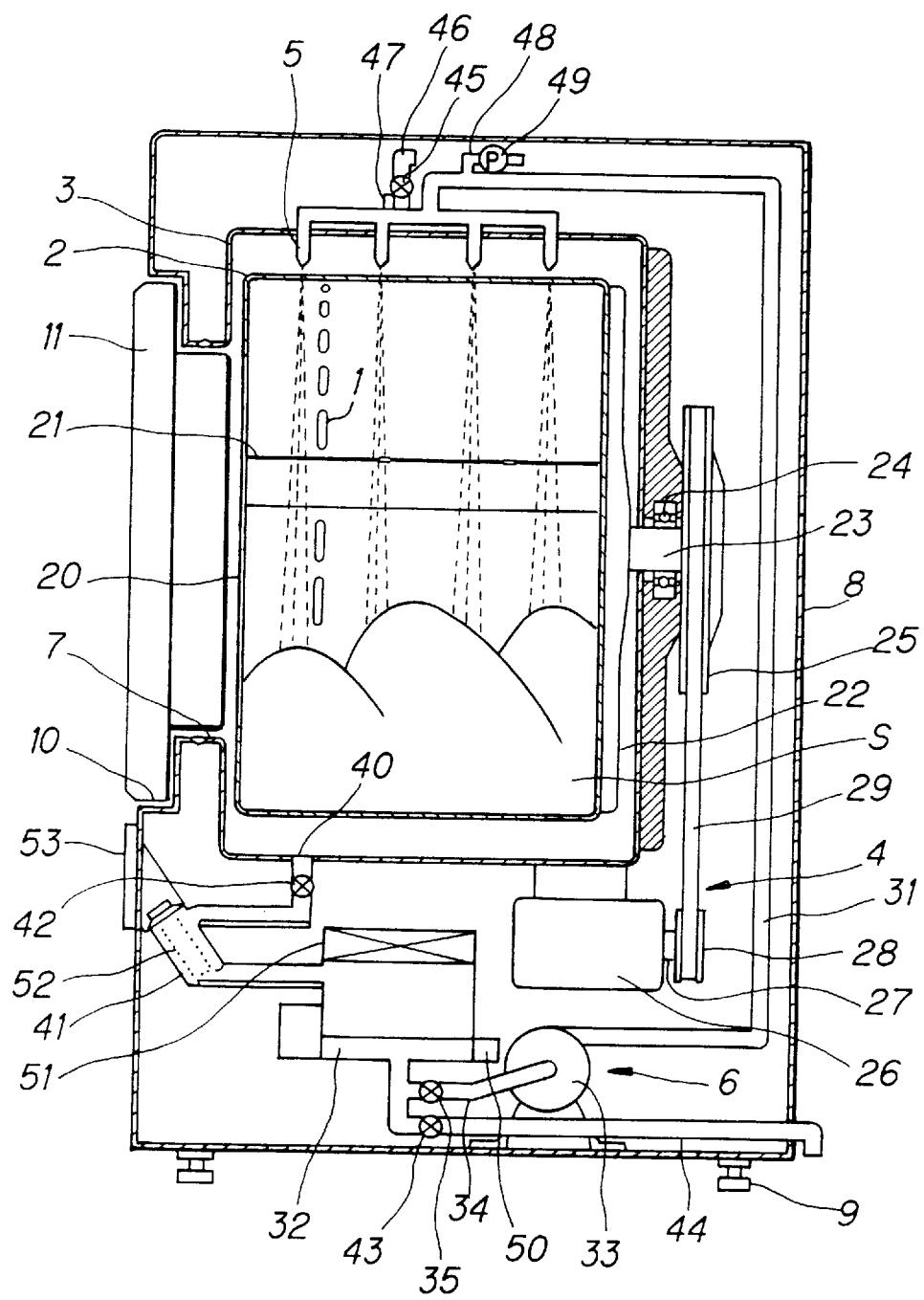
FIG. 1 is a longitudinal sectional side view of a drum type washing machine according to the first embodiment of the present invention.

FIG. 1 is a longitudinal sectional side view of a drum type washing machine according to the first embodiment of the present invention. As shown in FIG. 1, this drum type washing machine has a drum 2, a water tank 3, a drive unit 4, a plurality of injection nozzles 5, and an injection unit 6. The drum 2 accommodates laundry S and has a plurality of holes 1 at its circumferential wall. The water tank 3 rotatably supports the drum 2. The drive unit 4 rotates the drum 2 in the forward/reverse direction. The plurality of injection nozzles 5 inject a washing liquid (a cleaning liquid or a rinsing liquid) from the outer circumference of the drum 2 toward the center of the drum 2. The injection unit 6 operates the injection nozzles 5.

The water tank 3 is a cylindrical member having a front surface formed with a loading/unloading port 7 for loading/unloading laundry therethrough, and is placed horizontally. The water tank 3 is hung from a washing machine body 8 with springs (not shown) at its upper surface, and is supported by a damper (not shown) at its lower surface. The water tank 3 is held in this manner so that its vibration is attenuated. A weight is mounted to the water tank 3 to decrease vibration occurring during rotation of the drum. Legs 9 are attached to the four corners of the bottom surface of the washing machine body 8 to block transmission of the vibration to the floor and the like. An opening 10 communicating with the loading/unloading port 7 is formed in the front surface of the washing machine body 8, and a lid 11 that hermetically closes the loading/unloading port 7 is mounted to the washing machine body 8 such that it can be opened/closed.

Figure 2:
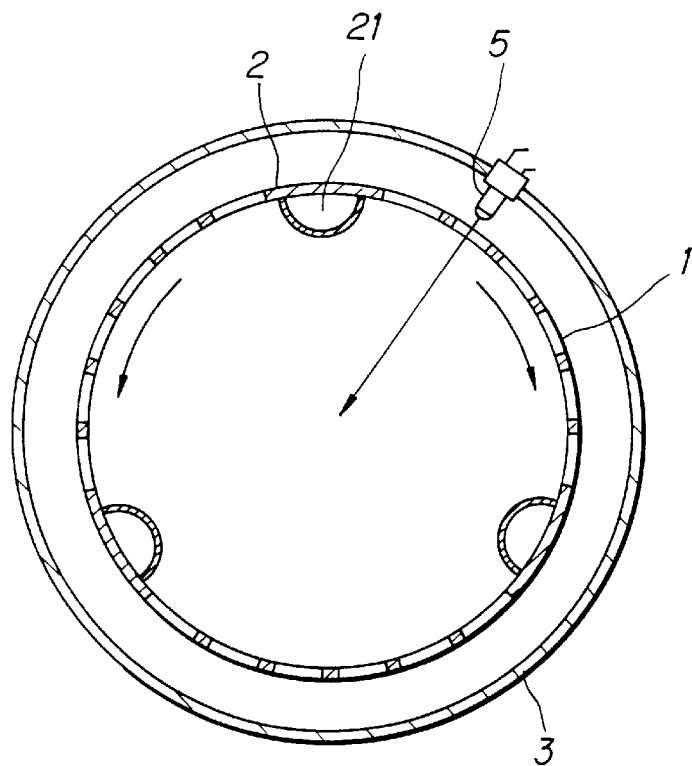
FIG. 2 is a longitudinal sectional front view of the drum shown in FIG. 1.

The drum 2 forms a cylindrical body having an opening 20 at its front surface. The holes 1 formed in the circumferential wall of the drum 2 are elongated in the circumferential direction while the two ends of each of the holes 1 in the circumferential direction are arcuated, so that the hands, fingers, and the laundry will not be damaged by the holes 1. Although these holes 1 are regularly arranged in the circumferential direction and the direction of the rotational axis of the drum 2, no holes 1 are formed in the peripheral edge of the circumferential wall. As shown in FIG. 2, three baffles 21 are equidistantly formed on the inner circumferential wall of the drum 2 to be parallel to the axial direction. Portions of the circumferential wall of the drum 2 corresponding to the rear surfaces of the baffles 21 and their periphery are non-apertured portions where no holes 1 are formed. In this embodiment, although no holes 1 are formed in the front and rear surfaces of the drum 2, holes may be formed there.

A horizontal shaft 23 is fixed to a rotation receiving portion 22 formed in the rear surface of the drum 2. The horizontal shaft 23 extends through the rear wall of the water tank 3 and is rotatably supported by a bearing 24. A drive pulley 25 is mounted to the distal end of the horizontal shaft 23. A motor 26 that can drive in the forward/reverse direction is mounted to the lower surface of the water tank 3, and a motor pulley 28 is mounted to an output shaft 27 of the motor 26. The motor pulley 28 and the drive pulley 25 are connected to each other with a drive belt 29. More specifically, the power to rotate the drum 2 is transmitted to the horizontal shaft 23 through the output shaft 27 of the motor 26, the motor pulley 28, the drive belt 29 and the drive pulley 25, which constitute the drive unit 4.

Figure 3:
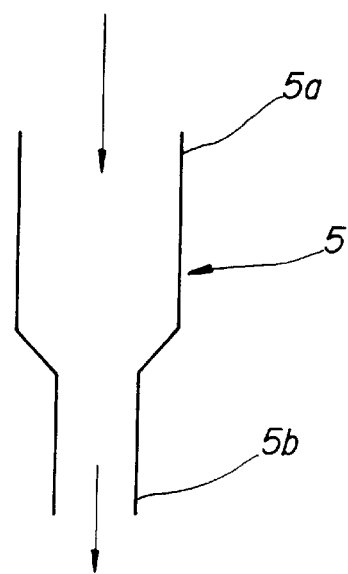
FIG. 3 is a longitudinal sectional view of the main part of an injection nozzle shown in FIG. 1.

The injection nozzles 5 are mounted at an obliquely upper right or left position of the water tank 3 to extend through the water tank 3, and the four injection nozzles 5 are arranged in a row in the direction of the rotational axis. As shown in FIG. 3, an injection port 5b smaller than an inlet port 5a is formed at the distal end of each injection nozzle 5. With this shape, when the washing liquid flows through the inlet port 5a and reaches the injection port 5b, its flow velocity is increased. When the washing liquid flows out through the injection port 5b, its flow is constricted to have a reduced sectional area, so that it can be injected linearly. The injecting direction is toward the center of the drum 2, and the injecting angle is 10° or less.

The injection unit 6 is composed of a circulating pipe 31 connected to the respective injection nozzles 5, a tank 32 for storing the washing liquid, and a liquid pump 33 for pressurizing the washing liquid supplied from the tank 32 and supplying the pressurized washing liquid to the circulating pipe 31. The liquid pump 33 is driven by a motor different from the motor 26 of the drive unit 4. A stop valve 35 is interposed in a connecting pipe 34 that connects the tank 32 and the liquid pump 33 to each other. The circulating pipe 31 branches before the water tank 3 to communicate with the respective injection nozzles 5.

A discharge pipe 41 communicates with a discharge port 40 formed in the lower surface of the water tank 3 and the tank 32, and a stop valve 42 is interposed in the discharge pipe 41, thereby constituting a circulator that circulates the washing liquid together with the injection unit 6. A discharge hose 44 interposed with a discharge valve 43 is connected to the tank 32, and the connecting pipe 34 branches on the upstream side of the discharge valve 43 of the discharge hose 44. A water supply pipe 46 interposed with a water supply valve 45 is connected to the upper portion of the water tank 3, and is connected to the water tap. A water supply sensor 47, e.g., a differential pressure, electromagnetic, volume, or ultrasonic type flow rate sensor, is mounted to the water supply pipe 46.

As a mixer for mixing air with the washing liquid and injecting the obtained mixture from the injection nozzles 5 (to be referred to as bubble jet in this embodiment), an air intake pipe 48 is connected to a portion of the circulating pipe 31 before it branches into the respective injection nozzles 5, and an air pump 49 is interposed in the air intake pipe 48.

A water amount sensor 50, e.g., a water level sensor, a weight sensor, is mounted to the tank 32 to detect the amount of stored water. Also, an anti-foaming unit 51 for suppressing foaming of the washing liquid is provided to the tank 32. The anti-foaming unit 51 is either one which is mounted to the side, bottom, or upper surface of the tank 32 and heats the foam, thereby breaking the foam; one which emits an ultrasonic wave having a frequency of 20 kHz, thereby breaking the foam; or one which drops an anti-foaming agent, e.g., silicone thereby breaking the foam. The foam in the tank 32 can be eliminated by the anti-foaming unit 51, so that intake of the foam into the liquid pump 33 is suppressed, thereby preventing degradation in performance of the liquid pump 33. Thus, the cleaning liquid can be efficiently circulated.

A heater that heats the washing liquid, and especially the cleaning liquid, may be mounted to the tank 32. The cleaning liquid effectively exhibits its detergency when it is heated to about 40° C. Thus, when the laundry is badly soiled, the detergent effect can be increased by heating the cleaning liquid.

A lint filter 52 for removing lint from the washing liquid is detachably provided midway along the discharge pipe 41, and an extract port 53 for removing the lint filter 52 therethrough is formed in the front surface of the washing machine body 8. The lint filter 52 is a finely woven bag made of fibers, and is inserted to close the discharge pipe 41. Thus, the lint and large dust are removed from the liquid discharged from the water tank 3. Then, since the liquid pump 33 will not be entangled or clogged with the lint or large dust, a decrease in performance of the liquid pump 33 can be prevented. When the lint filter 52 is periodically removed and cleaned, the high-pressure injecting operation of the cleaning liquid can be maintained, so that a decrease in detergency can be prevented.

Figure 4:
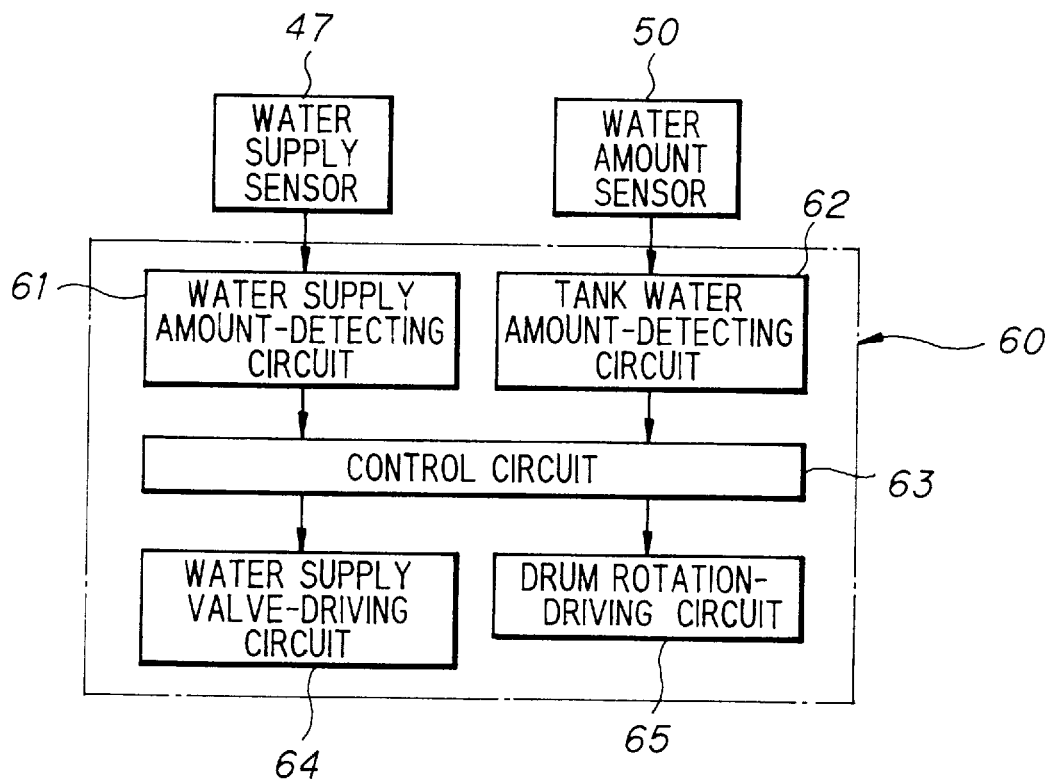
FIG. 4 is a block diagram of a control unit used in the drum type washing machine according to the first embodiment.

In the washing machine having the arrangement as described above, the drive unit 4, the injection unit 6, the air pump 49, and the respective valves are controlled by a control unit comprising a microcomputer in accordance with the washing, rinsing, and dehydrating steps, and the respective steps are executed based on input signals input from the operation keys of the operation panel provided on the outer surface of the washing machine body 8 and output signals from the water supply sensor 47, the water amount sensor 50, a temperature sensor, a contamination sensor, and the like. More specifically, as shown in FIG. 4, a control unit 60 has a water supply amount-detecting circuit 61, a tank water amount-detecting circuit 62, a control circuit 63, a water supply valve-driving circuit 64, and a drum rotation-driving circuit 65. The water supply amount-detecting circuit 61 detects the amount of supplied water from a detection signal output from the water supply sensor 47. The tank water amount-detecting circuit 62 detects the amount of water in the tank from a detection signal output from the water amount sensor 50. The control circuit 63 calculates the amount of laundry from signals output from the circuits 61 and 62 and sets operating conditions. The water supply valve-driving circuit 64 drives the water supply valve 45 with a drive signal output from the control circuit 63. The drum rotation-driving circuit 65 drives the motor 26 such that the rotation speed of the drum 2 changes from a high speed to a low speed or from a low speed to a high speed during washing. Although not shown, the control unit 60 also has drive circuits for driving the respective valves, drive circuits for driving the injection unit 6 and the air pump 49, and the like. Regarding how to calculate the amount of laundry, the difference between the amount of supplied water and the amount of water in the tank 32 at the start of washing is calculated first as it corresponds to the amount of water absorbed by the laundry S. This difference is multiplied by a coefficient in accordance with the material of the laundry S as the amount of water absorbed by the laundry S differs depending on the material of the laundry S, thereby calculating the amount of laundry. The material of the laundry S is input before the start of the operation.

In the above arrangement, when the laundry S is loaded in the drum 2 and the operation is started, the discharge valve 43 and the stop valve 35 are closed and the stop valve 42 is opened, the water supply valve 45 is opened, and water supply is started. When the water supply amount-detecting circuit 61 detects from the signal output from the water supply sensor 47 that the amount of supplied water reaches a predetermined value, the control circuit 63 sends a stop signal to the water supply valve-driving circuit 64, thus closing the water supply valve 45. Subsequently, the control circuit 63 sends a drive signal to the drum rotation-driving circuit 65, thus rotating the drum 2 at 50 rpm or less for about 15 seconds. Thereafter, the tank water amount-detecting circuit 62 detects the amount of water from a signal output from the water amount sensor 50. Since the laundry S absorbs water, the amount of supplied water and the amount of water stored in the tank 32 differ. The amount of absorbed water is obtained by subtracting the amount of water in the tank 32 from the amount of supplied water, and the calculated amount of absorbed water is multiplied by a coefficient in accordance with the material of the laundry S, thereby calculating the amount of laundry. The respective operating conditions for washing, rinsing, and dehydration in accordance with the amount of laundry S are set. In this manner, since the amount of laundry can be easily correctly detected within a short period of time without damaging the laundry, and washing is performed with an appropriate amount of water and an appropriate amount of detergent, economization of water and detergent can be achieved, so that a high detergency can be realized regardless of the amount of laundry while preventing damage to the laundry.

The above operation is repeated until the preset amount of water is obtained in the tank 32 while introducing a preset amount of detergent. The necessary amount of detergent may be displayed, and the detergent may be directly introduced through the opening 20 of the drum 2. Alternatively, a detergent introducing unit may be provided to the washing machine body 8. In this case, a necessary amount of detergent is supplied to automatically from a cleaning liquid upon supply of water, and the cleaning liquid is supplied to the drum 2. When a predetermined amount of cleaning liquid obtained by dissolving the detergent is stored in the tank 32, the washing operation is performed. The motor 26 is driven to rotate the drum 2. When the drum 2 is rotated, the stop valve 35 is opened and the liquid pump 33 is driven simultaneously, and the cleaning liquid stored in the tank 32 is guided to the upper portion of the water tank 3 through the circulating pipe 31. Air supplied by the air pump 49 is mixed with the cleaning liquid, and this mixture is linearly injected with a high pressure through the injection nozzles 5 from the obliquely upper portion of the drum 2 toward the center of the drum 2. The bubble jet obtained by mixing bubbles in the cleaning liquid enters the drum 2 through the holes 1 of the drum 2, and is uniformly injected over the laundry S.

When the holes 1 of the drum 2 are elongated to a long and narrow shape in the circumferential direction, as the drum 2 is rotated, they almost form one hole continuous in the circumferential direction. Then, the holes 1 do not interfere with entrance of the cleaning liquid, and the cleaning liquid is used effectively. The cleaning liquid is completely distributed over the laundry S with high-pressure injection from the obliquely upper portion of the drum 2, and then the detergency accompanying this high-pressure injection is improved. More specifically, if the cleaning liquid is injected from immediately above the drum 2, the cleaning liquid may not clean the laundry S but may be directly discharged through the discharge port 40 at the lower portion. If the cleaning liquid is injected from just beside the drum 2, the injecting pressure and the like may undesirably be decreased as the cleaning liquid is injected against gravity. Then, the impact on the laundry S and the complete distribution of the cleaning liquid may be interfered with. Hence, high-pressure injection from an obliquely upper portion of the drum 2 exhibits the best injection capability.

At the start of washing, the drum 2 is rotated at 50 rpm or less, which is an ordinary speed, in order to promote permeation of the cleaning liquid into the laundry S. With a lapse of about 2 minutes after the start when the cleaning liquid has permeated into the laundry S to a certain degree, the rotation speed of the drum 2 is increased to about 70 rpm to perform cleaning by tumbling for about 30 seconds to 1 minute. Thereafter, an operation at 70 rpm and an operation at 50 rpm or less are alternated at predetermined periods of time to promote the distribution of the cleaning liquid into the laundry S, thus improving the detergency. Immediately before the end of the washing operation, the rotation speed of the drum 2 is increased to about 70 rpm and cleaning is performed for about 1 to 1.5 minutes. When the rotation speed of the drum 2 is changed in this manner, the number of times that the laundry S is tumbled and dropped by the baffles 21 is increased, agitation of the laundry S is promoted, cloth entanglement is decreased, permeation of the cleaning liquid into the laundry S is promoted, and the impact caused by tumbling after permeation is increased, so that the cleaning liquid is distributed uniformly and thoroughly, thus eliminating non-uniformity in cleaning, leading to efficient cleaning. As a result, the detergency is improved and the cleaning time can be shortened.

When the cleaning liquid is linearly injected, a high impact can be applied to the laundry S, and the laundry S is disentangled. Then, the distribution of the cleaning liquid becomes uniform, thereby improving the detergency. When the cleaning liquid is injected in the form of a bubble jet, the impact on the laundry S is increased, thereby further improving the detergency. Table 1 shows examples in which the effect of bubble jet was confirmed experimentally. The rate of cleaning was examined by changing the flow rate and pressure of the bubble jet under experimental conditions that the amount of laundry was 2 kg, the amount of water was 13.4 l/minute, and the water pressure was 0.9 kgf/cm$^2$.

TABLE 1

|  | Flow Rate of Bubbles | Pressure of Bubbles | Rate of Cleaning | Standard Deviation |
| --- | --- | --- | --- | --- |
| Bubble Jet | 32 l/min. | 0.55 kgf/cm$^2$ | 28.0% | 2.15 |
| Bubble Jet | 21 l/min. | 1.18 kgf/cm$^2$ | 28.4% | 2.09 |
| Bubble Jet | 10 l/min. | 2.20 kgf/cm$^2$ | 27.9% | 2.61 |
| Jet | 0 l/min. | 0 kgf/cm$^2$ | 25.1% | 1.39 |

"Jet" means injection of only the cleaning liquid. According to Table 1, it is apparent that when a bubble jet is employed, the rate of detergency is increased and the detergency is improved as compared to a case wherein a jet in which air is not mixed is employed. The reason for this is assumed as follows. With an ordinary jet, when continuous injection is performed, the impact on the laundry S becomes chronic. In contrast to this, when air is mixed in the cleaning liquid, pulsed injection takes place to cause variation in the pressure. Then, the foam mixed in the cleaning liquid is expanded to break. This causes additional impact to act on the laundry S. As a result, the impact is increased, thus enhancing the cleaning effect.

The cleaning liquid injected toward the drum 2 is discharged into the water tank 3 through the holes 1 in the drum 2, flows into the discharge pipe 41 through the discharge port 40, passes the lint filter 52 so that lint and dust in it are removed, and then flows into the tank 32. As the cleaning liquid in the tank 32 is foaming, the foam is eliminated by the anti-foaming unit 51. The cleaning liquid is then guided from the tank 32 to the liquid pump 33 through the connecting pipe 34, is delivered in the circulating pipe 31 under pressure by the liquid pump 33, and reaches the injection nozzles 5 again. The cleaning liquid is circulated many times in this manner. Therefore, the laundry S can be efficiently cleaned with a small amount of cleaning liquid. As the cleaning liquid is not discharged to the outside of the washing machine during washing, economization of water is also achieved.

When this washing step is ended, the rinsing step is started. First, the discharge valve 43 is opened to discharge the cleaning liquid, and the water supply valve 45 is opened and water is supplied. After this, an operation identical to that in the washing step is performed. Note that the rotation speed of the drum 2 may be changed. At this time, rinsing may be performed by mixing an additive, e.g., a softener, a finisher, and the like in the rinsing liquid in the same manner as in a case wherein detergent is automatically introduced. When the rinsing step is ended, the discharge valve 43 is opened to discharge the rinsing liquid, and the drum 2 is rotated at a high speed to perform an ordinary dehydrating step. In centrifugal dehydration employing high-speed rotation, noise and vibration are increased. In order to prevent this, suction dehydration may be performed by providing a suction body and a suction unit. Then, dehydration can be performed without performing a high-speed rotation, thereby decreasing noise and vibration.

Figure 5:
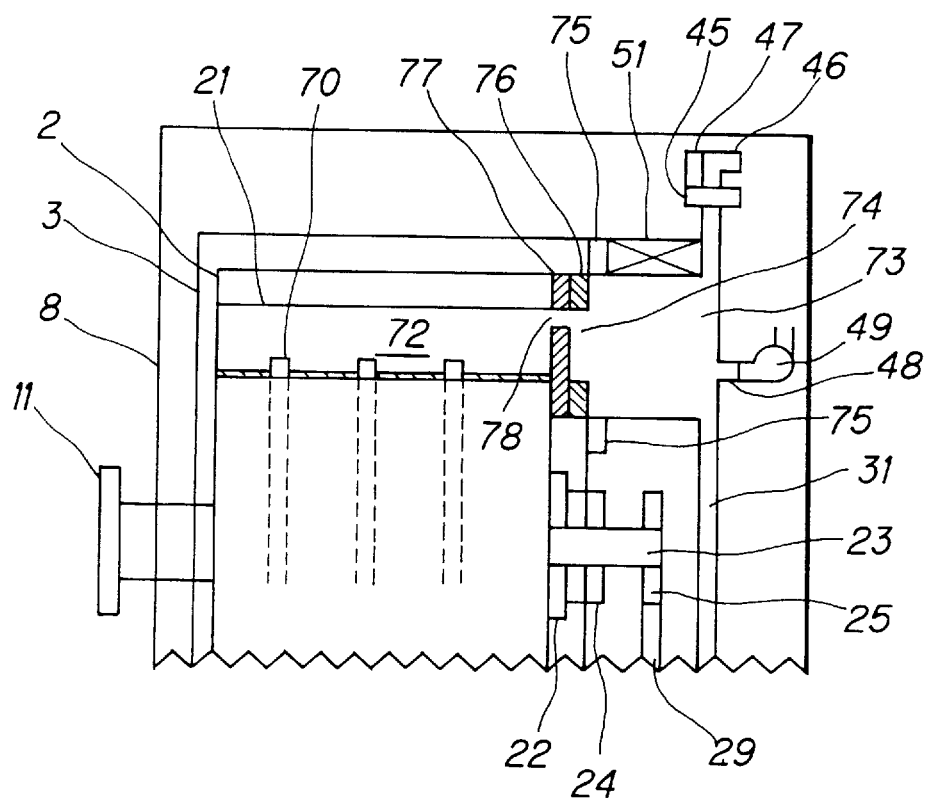
FIG. 5 is a longitudinal sectional side view of a drum type washing machine according to the second embodiment of the present invention.
Figure 6:
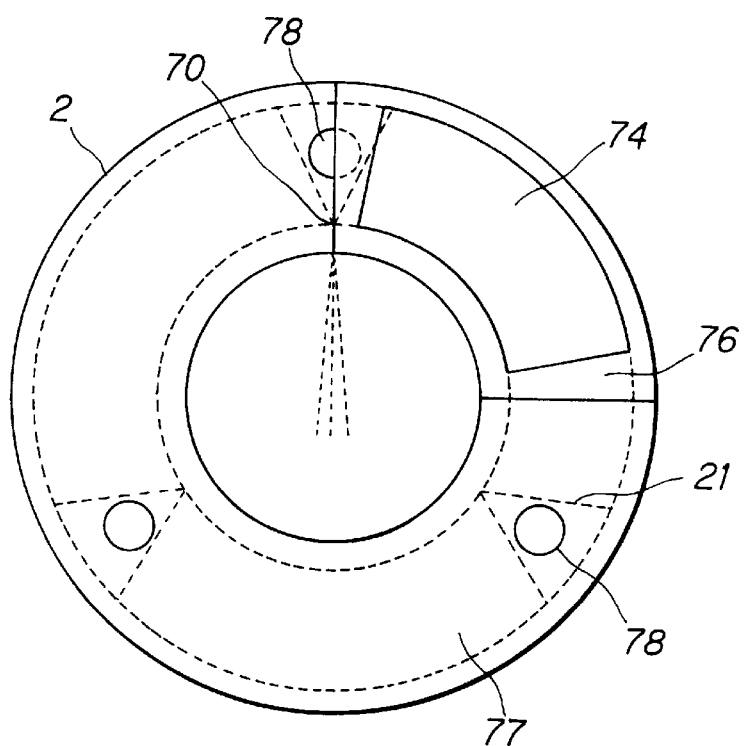
FIG. 6 is a rear view of the drum shown in FIG. 5.

FIG. 5 is a longitudinal sectional side view of the main part of a drum type washing machine according to the second embodiment of the present invention, and FIG. 6 is a rear view of the drum of FIG. 5. In the second embodiment, the same members as in the first embodiment are denoted by the same reference numerals.

In this embodiment, as shown in FIGS. 5 and 6, injection nozzles 70 are provided in a row at the highest portion of each baffle 21 of a drum 2. Each injection nozzle 70 has the same shape as that of the first embodiment and communicates with a space 72 defined between the corresponding baffle 21 and the circumferential wall of the drum 2. A tank 73 for storing a cleaning liquid or a rinsing liquid is provided between the space 72 of each baffle 21 and a circulating pipe 31 of an injection unit 6.

The tank 73 is mounted to a fan-shaped opening portion 74 formed in the obliquely upper portion of a water tank 3 with a support body 75, and has the shape of a fan of ¼ of the circumference of the water tank 3. The width of the opening portion 74 is equal to the height of each baffle 21, and a mechanical seal 76 is mounted around the opening portion 74. An annular mechanical seal 77 is similarly mounted on the drum 2. The two seals 76 and 77 connect the drum 2 and tank 73 to each other water-tightly and rotatably. Circular communication holes 78 are formed at portions of the drum-side mechanical seal 77 where the baffles 21 are located, and the communication holes 78 sequentially communicate with the opening portion 74 by rotation of the drum 2. The tank 73 is connected to an air intake pipe 48 interposed with an air pump 49 and a water supply pipe 46 interposed with a water supply valve 45, and an anti-foaming unit 51 is mounted to the tank 73. Pipes may be arranged in the spaces 72 of the baffles 21 to enable flow between the tank 73 and the injection nozzles 70. Other arrangements of the second embodiment are the same as those of the first embodiment.

When the washing step is started with the above arrangement, the cleaning liquid delivered under pressure from a liquid pump 33 is supplied to the tank 73 through the circulating pipe 31. When the communication hole 78 of one baffle 21 reaches the opening portion 74 upon rotation of the drum 2, the cleaning liquid is filled in the space 72 of this baffle 21, and the cleaning liquid is injected from the injection nozzles 70 toward the center of the drum 2 by the pressure of its own in the form of a bubble jet. Then, the washing and rinsing steps are executed in the same manner as in the first embodiment.

In an arrangement in which injection is performed from outside of the drum, the cleaning liquid or rinsing liquid partly collides with the circumferential wall of the drum, and the cleaning or rinsing liquid cannot be entirely effectively used. In contrast to this, in the second embodiment, the injection nozzles are provided through the baffles in the drum, and therefore the cleaning liquid or the like can be uniformly and efficiently injected toward the laundry, thereby improving the cleaning efficiency. Since the distance between the injection nozzles and the laundry is decreased, the impact is increased, further increasing the detergency. Since the detergency can be maintained even if the capacity of the pump is decreased, the cost can be decreased. The degree of freedom of the shape of the holes of the drum is increased.

Figure 7:
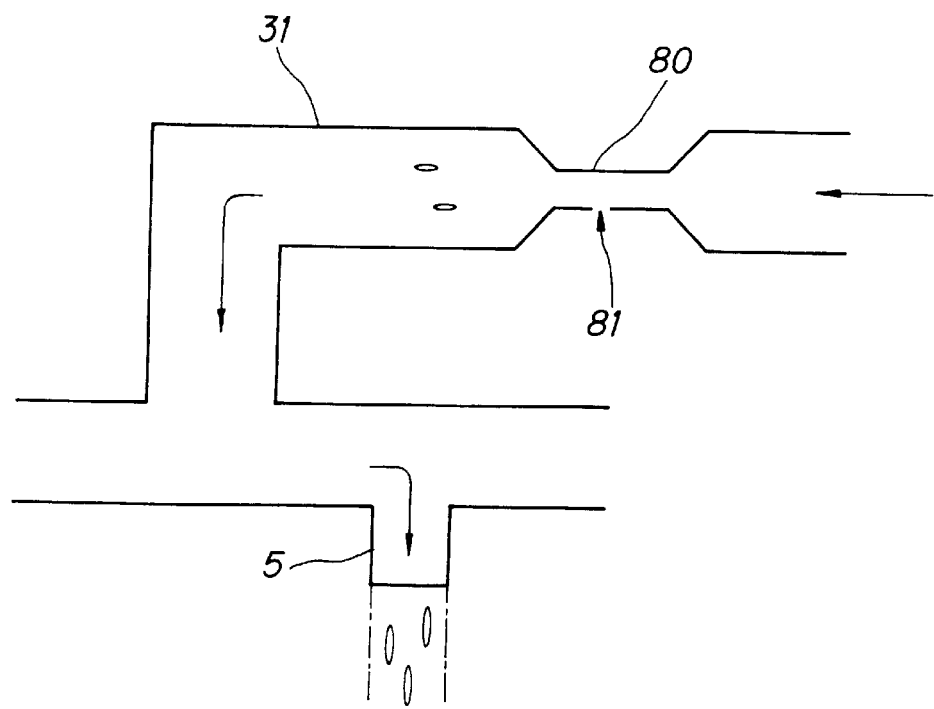
FIG. 7 is a sectional view showing another practical arrangement of a mixer which mixes air in a washing liquid.

In each of the embodiments described above, air pumps are used to mix air in the washing liquid. Alternatively, as shown in FIG. 7, a constricted portion 80 may be formed midway along the circulating pipe 31, and a hole 81 may be formed at one portion of the constricted portion 80. Then, the flow velocity is increased at the constricted portion 80 and the pressure is thus decreased. Therefore, air is drawn by suction through the hole 81 by an ejector effect, and the foam can be mixed in the washing liquid, thereby achieving air mixing at a low cost without using a device, e.g., a pump.

In each of the above embodiments, three baffles are employed. It suffices if at least two baffles are employed, and injection nozzles may be arranged in each baffle. If a large number of baffles are provided, it suffices if injection nozzles are arranged in some of the baffles.

When the injection pressure of the injection nozzles is set in accordance with the material of laundry, e.g., high if the material is cotton and low if the material is silk, the laundry can be washed gently without being damaged. When the injection pressure is changed in accordance with the amount of laundry, e.g., high when the amount of laundry is large and low when the amount of laundry is small, the washing liquid can be efficiently used, so that the load applied on the pump is also decreased. As a means for changing the injection pressure, the diameter of the injection nozzles may be changed or the supply flow rate to the injection nozzles may be changed by a flow rate control valve, in place of controlling drive of the pump, thereby performing more finely controlled cleaning.

Figure 8:
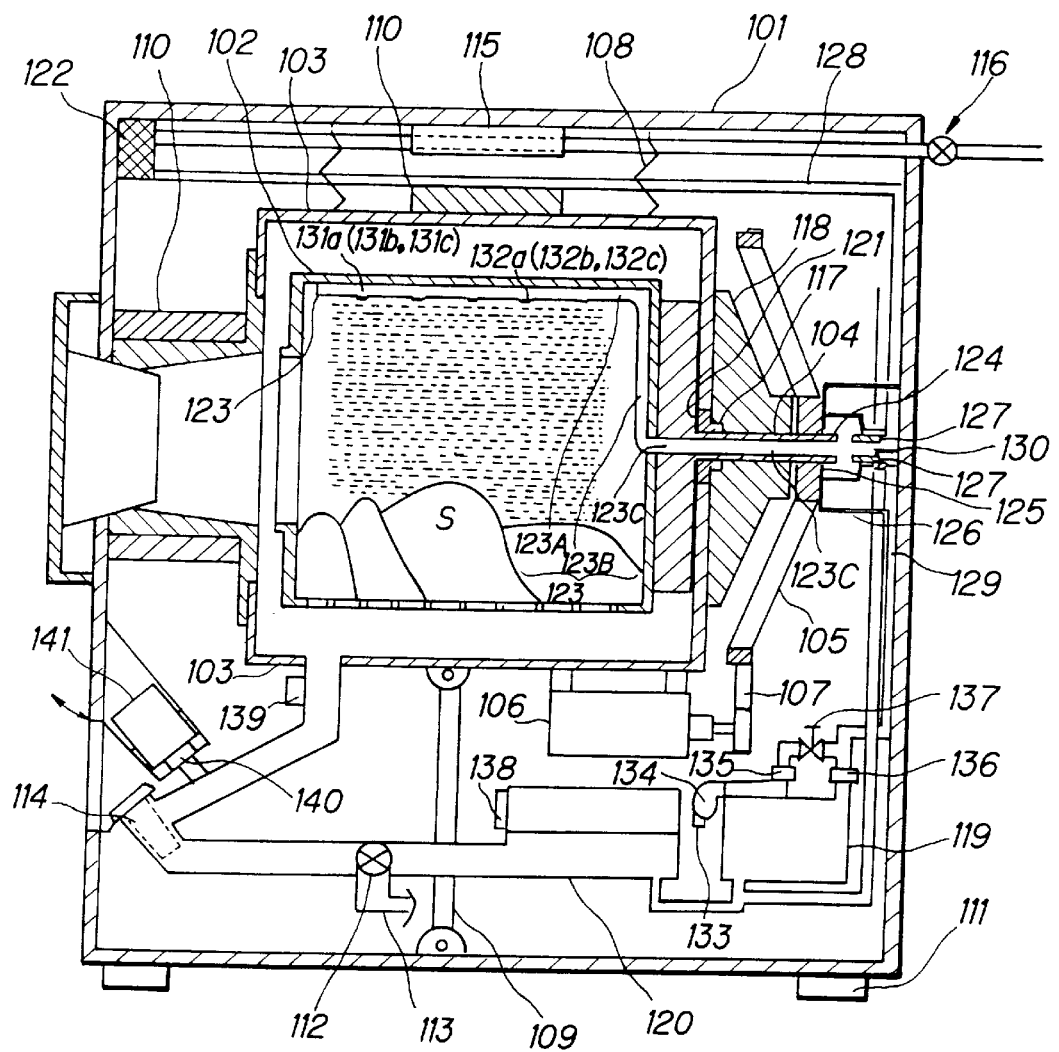
FIG. 8 is a longitudinally sectional side view of a drum type washing machine according to the third embodiment of the present invention.

FIG. 8 is a longitudinal sectional side view of a drum type washing machine according to the third embodiment of the present invention.

Referring to FIG. 8, reference numeral 101 denotes a washing machine body. A plurality of holes are formed in part of a drum 102 that accommodates laundry and rotates in order to centrifugally dehydrate the water content in the laundry. A water tank 103 is provided around the drum 102. A horizontal shaft 104 having one end fixed to the rotation center of the drum 102 is provided to extend through the central portion of the water tank 103, and a drum pulley 105 is fixed to the other end of the horizontal shaft 104. A drum-rotating motor 106 is provided under the water tank 103, and the rotating shaft of the motor 106 is connected to the drum pulley 105 through a belt 107. In order to absorb vibration, the water tank 103 is suspended from the washing machine body 101 with springs 108, and a damper 109 is provided between the lower portion of the water tank 103 and the bottom surface of the washing machine body 101. Also, weights 110 are provided on the upper and front portions of the water tank 103, thereby decreasing vibration that occurs when the drum is rotating.

Reference numeral 111 denotes installation legs provided to the bottom surface of the washing machine body 101; 112, a discharge valve; 113, a discharge pipe; 114, a lint filter provided to allow easy removal of the lint at the front side of the washing machine body; 115, a control unit of a motor, valves, pumps, and the like; 116, a water supply valve; 117, a bearing; 118, a balancer; 119, a washing liquid pump: 120, a washing water tank; 121, an oil seal; and 122, a detergent introduction port, respectively.

The main part of this embodiment will be described. Reference numeral 123 denotes a washing liquid supply pipe fixed to the drum 102. The washing liquid supply pipe 123 is composed of three supply pipe injecting portions 123A, one supply pipe shaft portion 123C, and three supply pipe connecting portions 123B. The three supply pipe injecting portions 123A respectively have baffles 131a, 131b, and 131c fixed to the inner circumferential surface of the drum 102 and a plurality of injection nozzles 132a, 132b, and 132c each having a diameter of 2 to 5 mm. The supply pipe shaft portion 123C has a pipe nipple 124 at its one end and is coaxial with the horizontal shaft 104 serving as the drum rotating shaft. The three supply pipe connecting portions 123B branch from the shaft portion 123C in three directions and communicate with the injecting portions 123A. An oil seal 125 seals the supply pipe shaft portion 123C and a fixing support body 126. A pipe nipple 127 is mounted to the fixing support body 126 and is connected to a water supply pipe 128 and a circulating pipe 129. A selector valve 130 selects whether water to be supplied to the drum 102 is supplied from either the water supply pipe 128 or the circulating pipe 129.

Reference numeral 133 denotes an air intake port for taking air into the washing liquid; and 134, an air pump. A regulating valve 137 operates in an interlocking manner with an air flow rate sensor 135 and regulates the flow rate of air based on the amount of water detected by a water amount sensor 136. Thus, the volume mixing ratio is regulated to about 1:1.

Reference numerals 138 and 139 denote first and second foam sensors, respectively, that detect the height of the foam of the washing liquid. When either the first or second foam sensor 138 or 139 detects foam, an anti-foaming agent adding port 140 is opened, and an anti-foaming agent, e.g., silicone oil, is added to the washing liquid from an anti-foaming agent supply unit 141. The set portion of the anti-foaming agent supply unit 141 is mounted to the front portion of the washing machine body to facilitate maintenance.

The first foam sensor 138 in the washing water tank 120 consists of three pairs (high, middle, and low) of optical sensors provided in the washing water tank 120 at different levels, and detects the presence of foam by radiating light every predetermined period of time after the start of washing. The second foam sensor 139 in the circulating pipe 129 is a flowmeter. The second foam sensor 139 constantly measures the flow rate in the circulating pipe 129 after the start of washing and detects the presence of foam when the flow rate is abruptly decreased.

Figure 9:
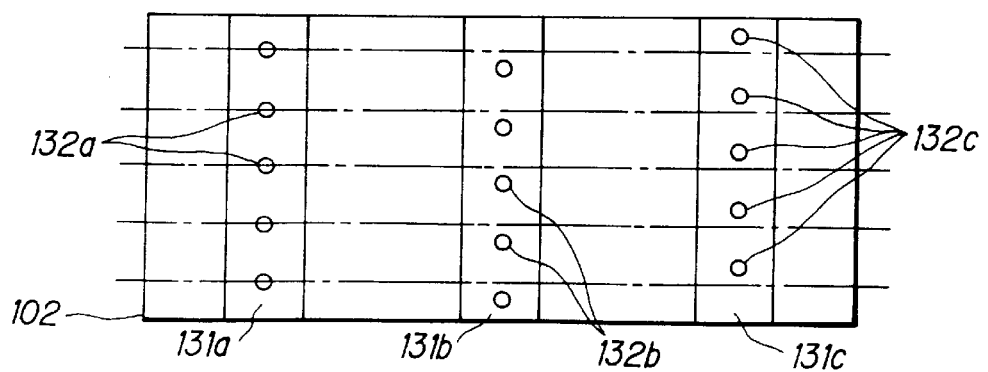
FIG. 9 is a developed view showing the arrangement of injection nozzles shown in FIG. 8.

FIG. 9 is a developed diagram of the drum 102 shown in FIG. 8 and shows the relative positions of the plurality of nozzles. The plurality of injection nozzles 132a, 132b, and 132c on the three baffles 131a, 131b, and 131c arranged at an angular interval of 120° are slightly staggered on the baffles in the direction of the depth of the drum (the direction of the horizontal shaft). Therefore, the number of injection lines of the cleaning water in the drum 102 is increased, thereby increasing the capability to thoroughly clean the laundry.

The silicone oil serving as the anti-foaming agent has an effect of breaking the foam by decreasing the surface tension of the cleaning liquid, and is formulated to contain, e.g., a dimethyl silicone oil as the base material. The silicone oil anti-foaming agent is employed in a wide area including food and pharmaceutical-related fields, and its safety is guaranteed. As anti-foaming can be achieved in a content of 100 to 150 ppm, this agent does no harm to the human body as well as to the laundry. As the content is small, it suffices if the agent is added once for each washing. The agent is added once when either the foam sensor 138 or 139 detects foam.

Figure 10:
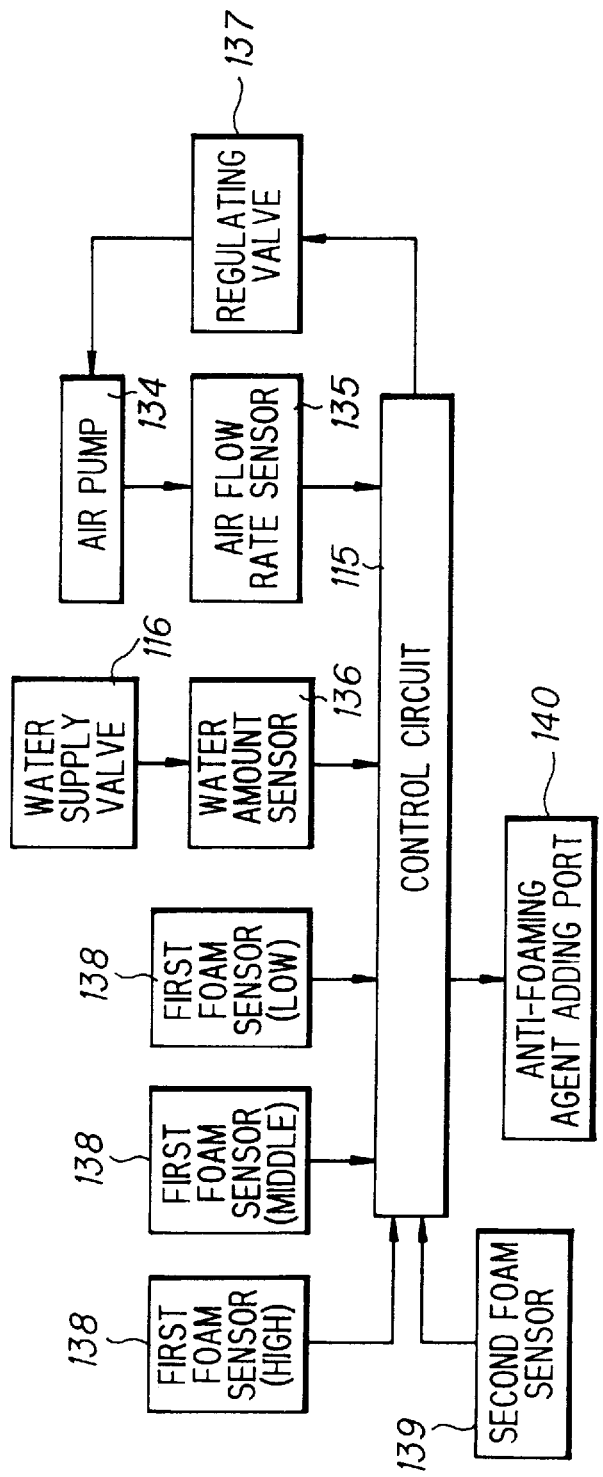
FIG. 10 is a block diagram of a control unit used in the drum type washing machine according to the third embodiment.
Figure 11:
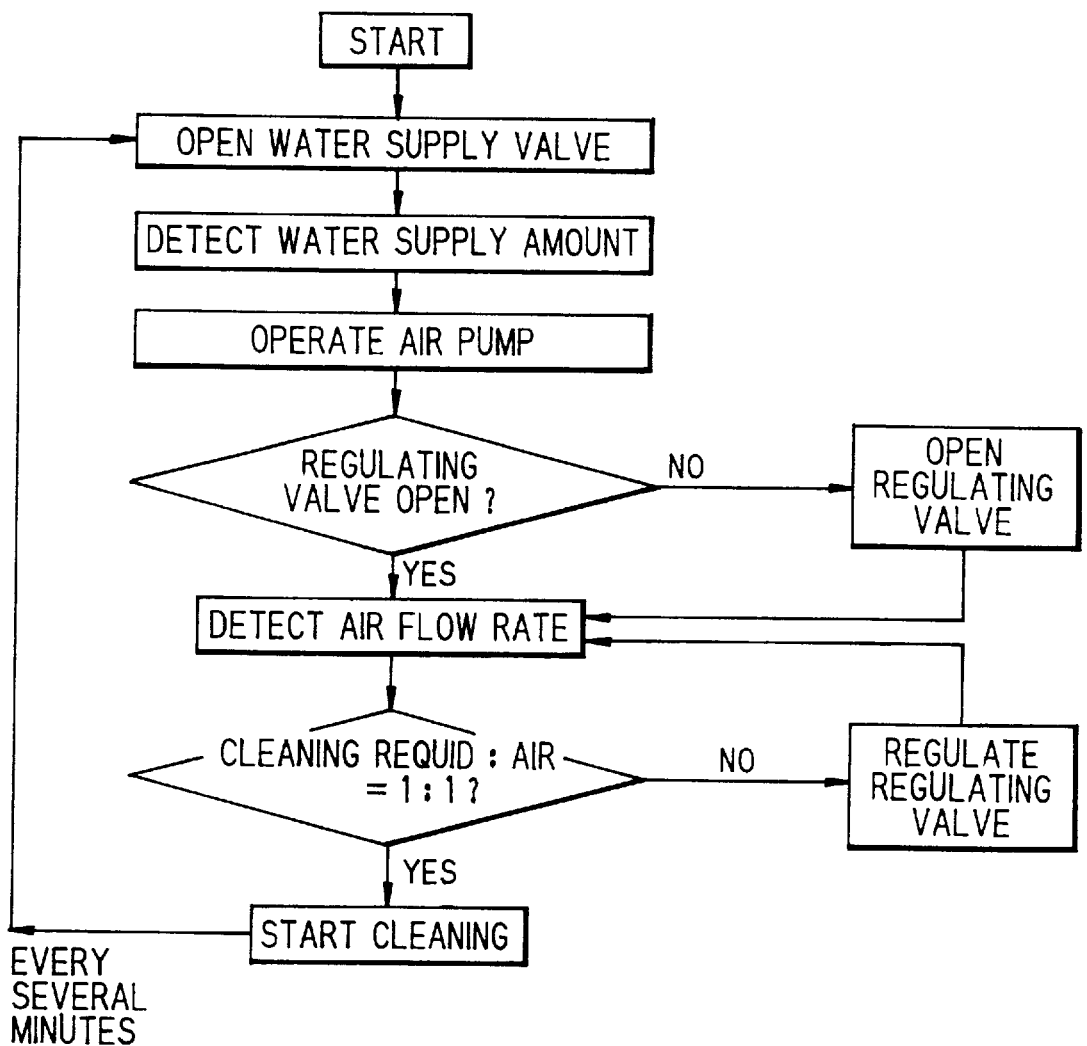
FIG. 11 is a flow chart of a control operation employed in the drum type washing machine according to the third embodiment.

The operation of the washing machine having the above arrangement will be described with reference to FIGS. 8, 10, and 11. Laundry S is loaded in the drum 102, and detergent corresponding in amount to the laundry S is put in the detergent introduction port 122. When the washing start button is depressed, the control unit 115 operates to open the water supply valve 116, so that water is supplied. The supplied water dissolves the detergent as it passes through the detergent introduction port 122, flows through the water supply pipe 128 and the selector valve 130 opened to the water supply side, branches into three directions at the shaft portion 123C of the supply pipe 123, flows through the plurality of injection nozzles 132a to 132c from the three injecting portions 123A, and is injected to the laundry S. After cleaning, the injected cleaning liquid is deprived of lint and dust by the lint filter 114, stored in water tank 120, and is sent to the circulating pipe 129 by the washing liquid pump 119. Simultaneously, the regulating valve 137 is opened. The air pump 134 is actuated to take air through the air intake port 133. The flow rate of air is detected by the air flow rate sensor 135. The flow rate of cleaning liquid delivered by the washing liquid pump 119 is detected by the water amount sensor 136 and compared by the control unit 115. The air flow rate is regulated by the regulating valve 137 so that the volume ratio of the washing water to air is about 1:1, and is confirmed by the air flow rate sensor 135. The obtained bubble jet cleaning liquid flows through the circulating pipe 129 and selector valve 130 opened to the circulation side, and is supplied to the drum 102 again. This cycle is repeated several times, thereby performing cleaning.

During the cleaning operation, when the first foam sensor 138 detects foam at the high, middle, or low level, or the second foam sensor 139 detects foam, the control unit 115 is operated to open the anti-foaming agent adding port 140, thereby adding the anti-foaming agent to the cleaning liquid.

When the washing step is ended, the discharge valve 112 is opened to the discharge pipe 113 side, and the cleaning liquid is discharged while dehydrating the washing by rotating the drum 102. Then, the discharge valve 112 is closed, the water supply valve 116 is opened, and jet rinsing or circulating jet rinsing with tap water is performed in a step similar to the above washing step. The discharge valve 112 is opened to the discharge pipe 113 side, and water discharge and dehydration are performed while rotating the drum 102.

TABLE 2

| Mixing Ratio | Rate of Cleaning (%) |
|---|---|
| 1:1.7 | 26.3 |
| 1:1.3 | 27.7 |
| 1:1 | 30.9 |
| 1:0.7 | 28.5 |
| 1:0.2 | 26.1 |
| 1:0 | 25.4 |

Table 2 shows the relationship between the mixing ratio of the cleaning liquid to air and the rate of cleaning. The rate of cleaning is the percentage of the degree of cleaning calculated by a washing performance test determined by JIS C 9606.

$$\text{Rate of cleaning } E = D \times 100 = (R_w - R_1)/(R_0 - R_1) \times 100$$

where

E: rate of cleaning (%)

D: degree of cleaning $R_w$: reflectance (%) of contaminated cloth after washing $R_1$: reflectance (%) of contaminated cloth before washing $R_0$: reflectance (%) of non-contaminated cloth It is apparent from Table 2 that the effect of detergency is highest when the mixing ratio of the cleaning liquid to air is 1:1, providing highly-efficient cleaning of cloths.

Figure 12:
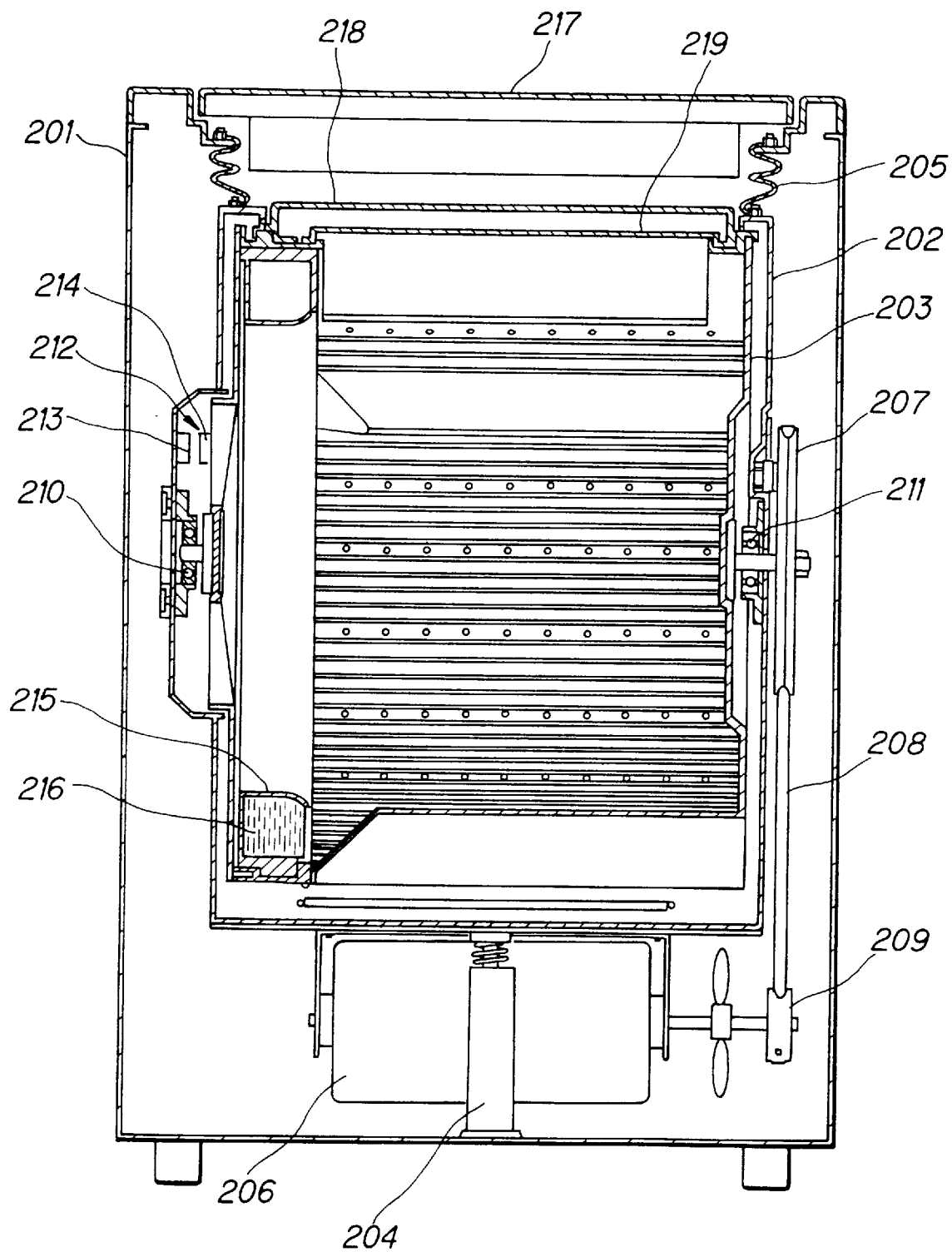
FIG. 12 is a longitudinally sectional side view of a drum type washing machine according to the fourth embodiment of the present invention.

FIG. 12 is a longitudinal sectional side view of a drum type washing machine according to the fourth embodiment of the present invention.

Referring to FIG. 12, reference numeral 201 denotes a box-like washing machine body; 203, a cylindrical perforated drum; 202, a water tank; 204, a damper; and 205, springs. The washing machine body 201 is rotatable about a horizontal shaft. The water tank 202 has a discharge port, is provided to surround the entire portion of the drum 203, and rotatably, axially supports the drum 203 through bearings 210 and 211. The drum 203 is rotatable about a horizontal shaft. The damper 204 supports the water tank 202 and moderates vibration. The springs 205 suspend the water tank 202 and moderate vibration.

Reference numeral 206 denotes a drum-rotating motor; 207, a drive pulley for driving the drum; 208, a drive belt; 209, a pulley directly coupled to the motor; and 215, a liquid balancer. The laundry is loaded/unloaded by opening/closing an outer lid 217, an intermediate lid 218 provided to the water tank 202, and an inner lid 219 provided to the drum. Reference numeral 221 denotes a baffle (see FIG. 13) for tumbling the laundry; 215, a liquid balancer; and 212, a rotation sensor. The liquid balancer 215 is obtained by hermetically sealing a liquid 216 in a hollow annular body concentrically formed in the drum 203. The rotation sensor 212 is constituted by a lead switch 213 and a magnet 214.

Figure 13:
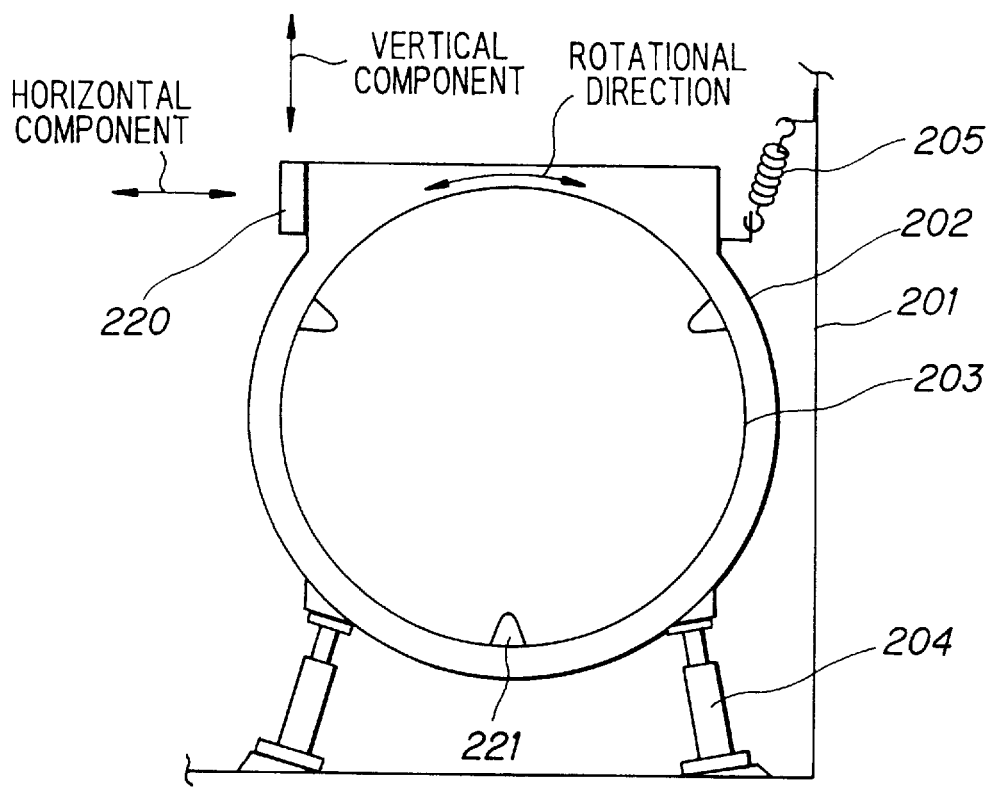

FIG. 13 shows the principle of the mounting position of a vibration sensor 220.

Referring to FIG. 13, the vibration sensor 220 is mounted to the water tank 202 to detect the horizontal or vertical component of the rotational direction of the drum 203. An example of the vibration sensor 220 includes one utilizing the piezoelectric effect of a piezoelectric element, e.g., quartz or ceramic, that outputs an electrical signal proportional to an acceleration applied to it.

Figure 14:
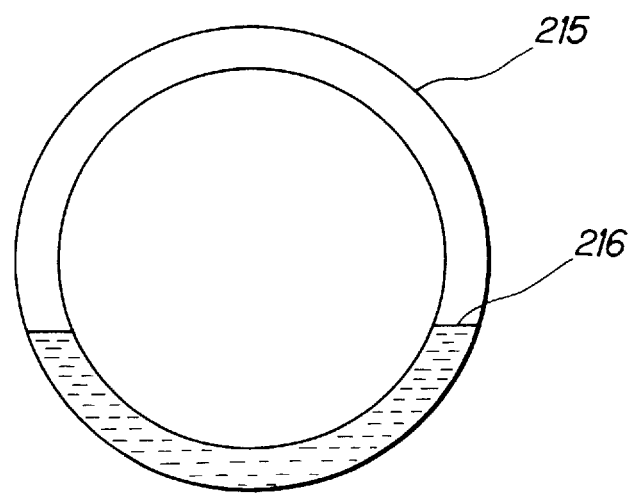
FIG. 14 is a longitudinal sectional view of a liquid balancer mounted to the drum shown in FIG. 12.

The principle of the vibration sensor 220 is as follows. A weight in the housing constituting the vibration sensor 220 applies a force to the piezoelectric element upon application of an external vibration. The balance between the anions and cations of the piezoelectric element is disordered by the stress caused by the vibration, and the piezoelectric element thus generates charges. The charges are accumulated in the electrodes and finally output through a circuit. The amount of accumulated charges is proportional to the applied force, and this force is proportional to the acceleration. FIG. 14 is a sectional front view of the liquid balancer 215 of FIG. 12. As shown in FIG. 14, while the drum is stopped, the liquid 216 hermetically sealed in the liquid balancer 215 is concentrated on the lower portion of the liquid balancer 215.

Figure 15:
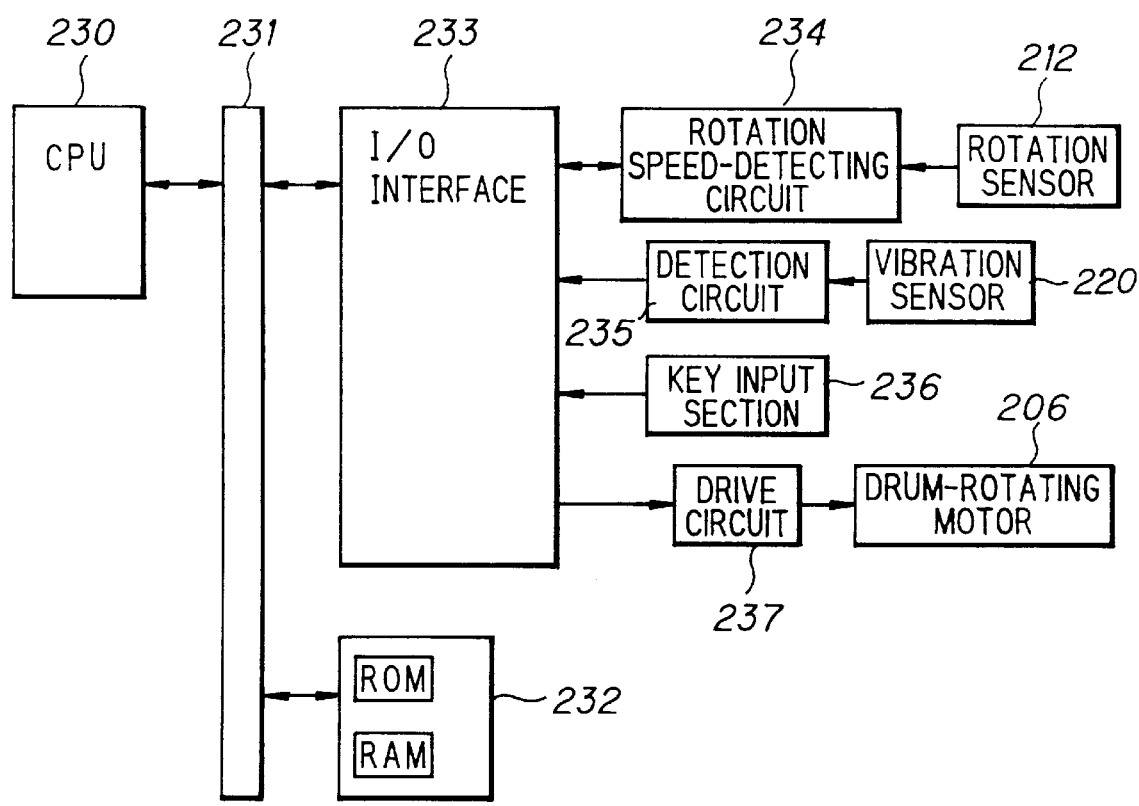
FIG. 15 is a block diagram of a control unit used in the drum type washing machine according to the fourth embodiment.

FIG. 15 is a block diagram showing an electronic control circuit used in the drum type washing machine shown in FIG. 12.

This electronic control circuit is constituted by a CPU 230 comprising a control section and an operation section, a data bus 231, a memory 232 having a ROM and a RAM, an I/O interface 233, a rotation speed-detecting circuit 234 including the rotation sensor 212, a vibration detection circuit 235 including the vibration sensor 220, a key input section 236, a motor drive circuit 237, the drum-rotating motor 206, and the like.

Figure 16:
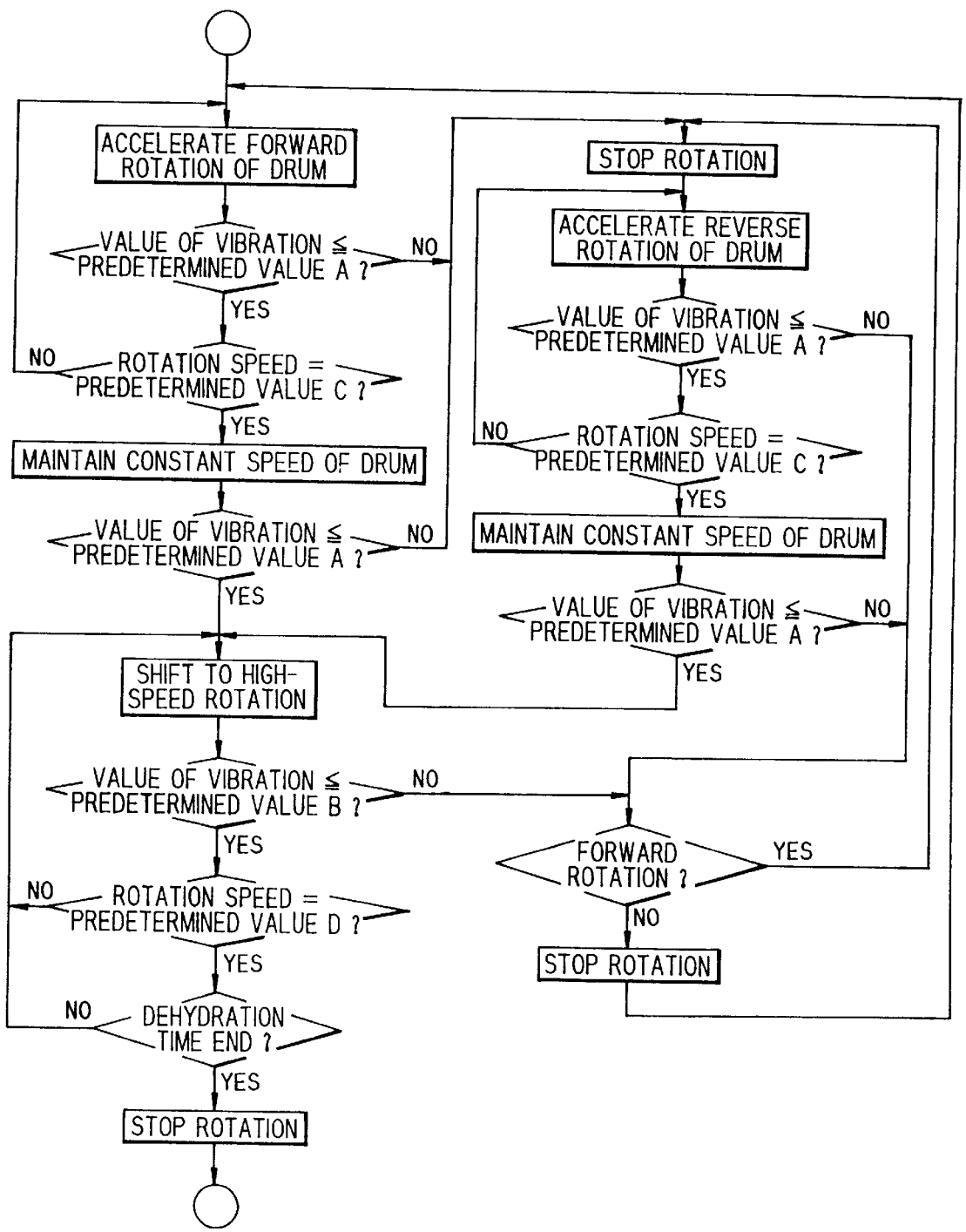
FIG. 16 is a flow chart of a control operation employed in the drum type washing machine according to the fourth embodiment.

An unbalance corrector and how to control vibration in the hydrating step in which the drum 203 is rotated at a high speed will be described in accordance with the flow chart of FIG. 16.

First, the drum 203 is rotated in the forward direction at a low speed. When a vibration at a predetermined low rotation speed C (e.g., 200 rpm) related to a vibration at high-speed rotation is a predetermined vibration value A or less, the drum 203 is accelerated. When the rotation reaches a predetermined high-speed rotation speed D (e.g., 1,000 rpm), this speed is maintained for a predetermined dehydration time to complete dehydration.

When the vibration exceeds the predetermined vibration value A at low-speed rotation, the drum 203 is stopped and is rotated in the reverse direction immediately to correct localization of the laundry. When the vibration at the low rotation speed C is the vibration value A or less, the drum 203 is accelerated to perform dehydration with a high-speed rotation in the same manner as described above. When the vibration undesirably exceeds the vibration value A at the low-speed rotation, the drum 203 is stopped immediately and is rotated in a direction opposite to that described above (forward direction in this case), thereby correcting localization of the laundry. Then, normal dehydration is performed. In the entire process, when the vibration exceeds the predetermined vibration value B, the drum 203 is stopped immediately, localization of the laundry is corrected, and normal dehydration is performed.

Figure 17:
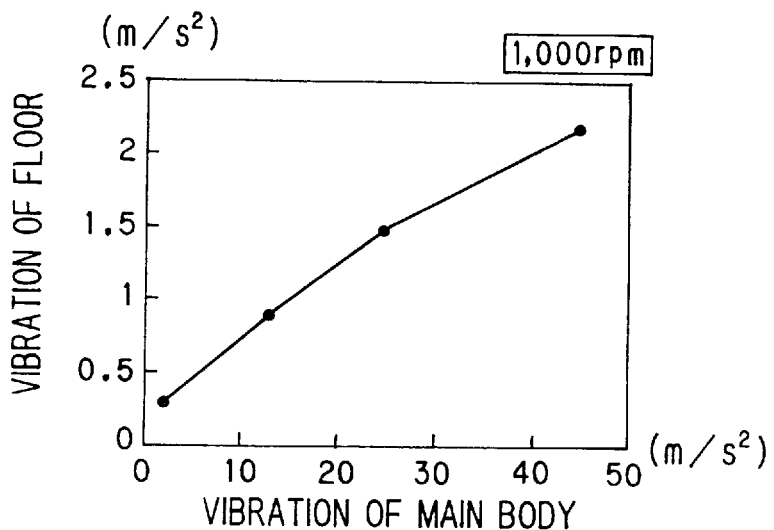
FIG. 17 is a graph showing the relationship between the acceleration of vibration of the floor and the acceleration of vibration of the washing machine body.

FIG. 17 is a graph showing the relationship between the vibration acceleration of the washing machine body and the vibration acceleration of the floor when the rotation speed is 1,000 rpm. As is apparent from FIG. 17, when the vibration sensor 220 is provided to the water tank 202 that generates the vibration in order to detect the horizontal or vertical component of the vibration that occurs in the rotating direction of the drum 203, a vibration which is almost proportional to the component that most influences the vibration of the floor where the drum type washing machine is placed can be detected.

Figure 18:
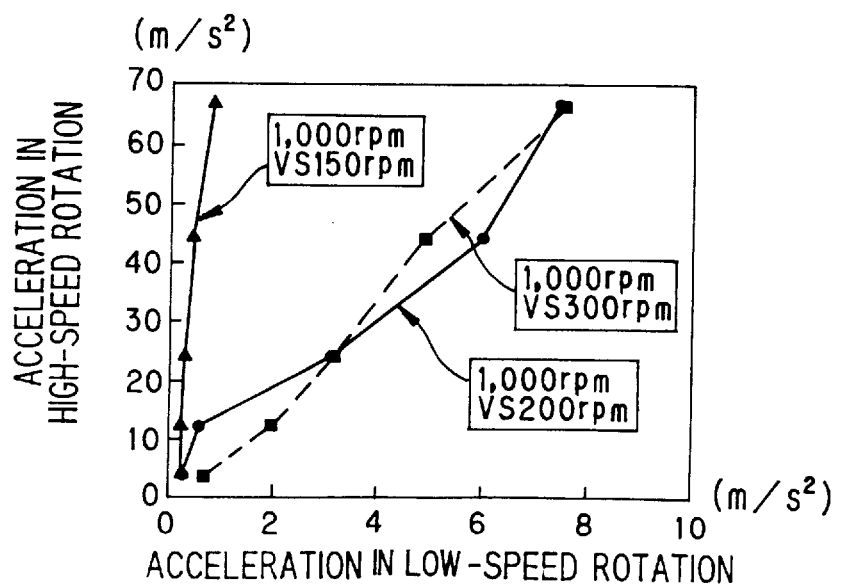
FIG. 18 is a graph showing the relationship between the acceleration of vibration in a high-speed operation and the acceleration of vibration in a low-speed operation.

FIG. 18 is a graph indicating that, in an example of the vibration system of the two-axis support drum type washing machine, the vibration acceleration at high-speed rotation can be predicted from the vibration acceleration at low-speed rotation. From this relationship, it is apparent that in order to perform detection at a speed as low as possible with a good resolution, 200 rpm is appropriate.

Figure 19:
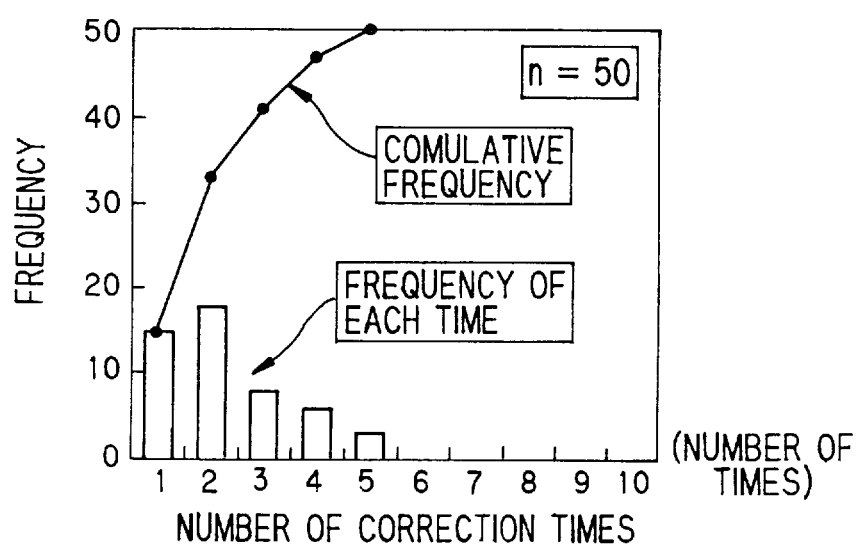
FIG. 19 is a graph showing the relationship between the frequency and the number of times of correction, both of which are required for correcting localization of the laundry.

FIG. 19 shows cases in which localization of laundry can be corrected by the forward reverse rotating action of the drum 203. Of the fifty cases, three cases required five times as the number of correction times. This indicates that although the value of vibration exceeded the predetermined value A until four times as the number of correction times, the value of vibration cleared the value A for the first time when the fifth correcting operation was performed. The vibration value A was cleared even with one to two correction times at a high frequency, as a matter of course.

It is known that, when the liquid balancer 215 is provided, in high-speed rotation, the liquid 216 moves to the opposite side of the unbalance in order to solve the unbalance as the whole of a rotating body, thereby decreasing the vibration in high-speed rotation. In this case, however, the vibration value in high-speed rotation with respect to the vibration value in low-speed rotation is decreased as compared to the relationship shown in FIG. 18. Thus, the margin of the unbalance was further widened.

In the liquid balancer 215 of the present invention, predetermined amounts (½ the inner volume or less) of a viscous liquid and a high-boiling liquid are injected into an annular hollow body and hermetically sealed. An example of the viscous liquid and the high-boiling liquid includes glycerin. Glycerin can be diluted with water, polyethylene glycol, or the like. Table 3 shows the nature of a 90% glycerin solution diluted with water in comparison with that of water. From Table 3, glycerin is apparently more effective.

TABLE 3

|  | Boiling Point | Vapor Pressure (100° C.) | Viscosity (20° C.) |
|---|---|---|---|
| Glycerin (90%) | 138° C. | 220 mmHg | 230 c.p. |
| Water | 100° C. | 760 mmHg | 1 c.p. |

As another example of the liquid balancer, air in the annular hollow body is evacuated by a vacuum pump to decrease the pressure, and a predetermined amount of liquid is injected into the annular hollow body and is hermetically sealed, thus forming a liquid balancer. In this case, the level of decompression may be set such that $P_1=P_2$ is satisfied when the internal pressure of the annular hollow body in room temperature is $(760-P_1)$ mmHg and the internal pressure of the annular hollow body at a high temperature is $(760+P_2)$ mmHg. Then, an excessive decompression can be avoided. According to the present invention, the range of the liquid that can be employed is widened, so that a more appropriate liquid balancer in accordance with the application can be provided.

The present invention has been described by way of a two-axis support top-loading drum type washing machine. However, the present invention is not limited to this, but can be similarly applied to a uni-axis support or front-loading drum type washing machine, and furthermore a vortex or agitation type full-automatic washing machine, as a matter of course. The liquid balancer of the present invention, the unbalance corrector of the present invention, and the vibration controller of the present invention may be arranged independently of each other.

Figure 20:
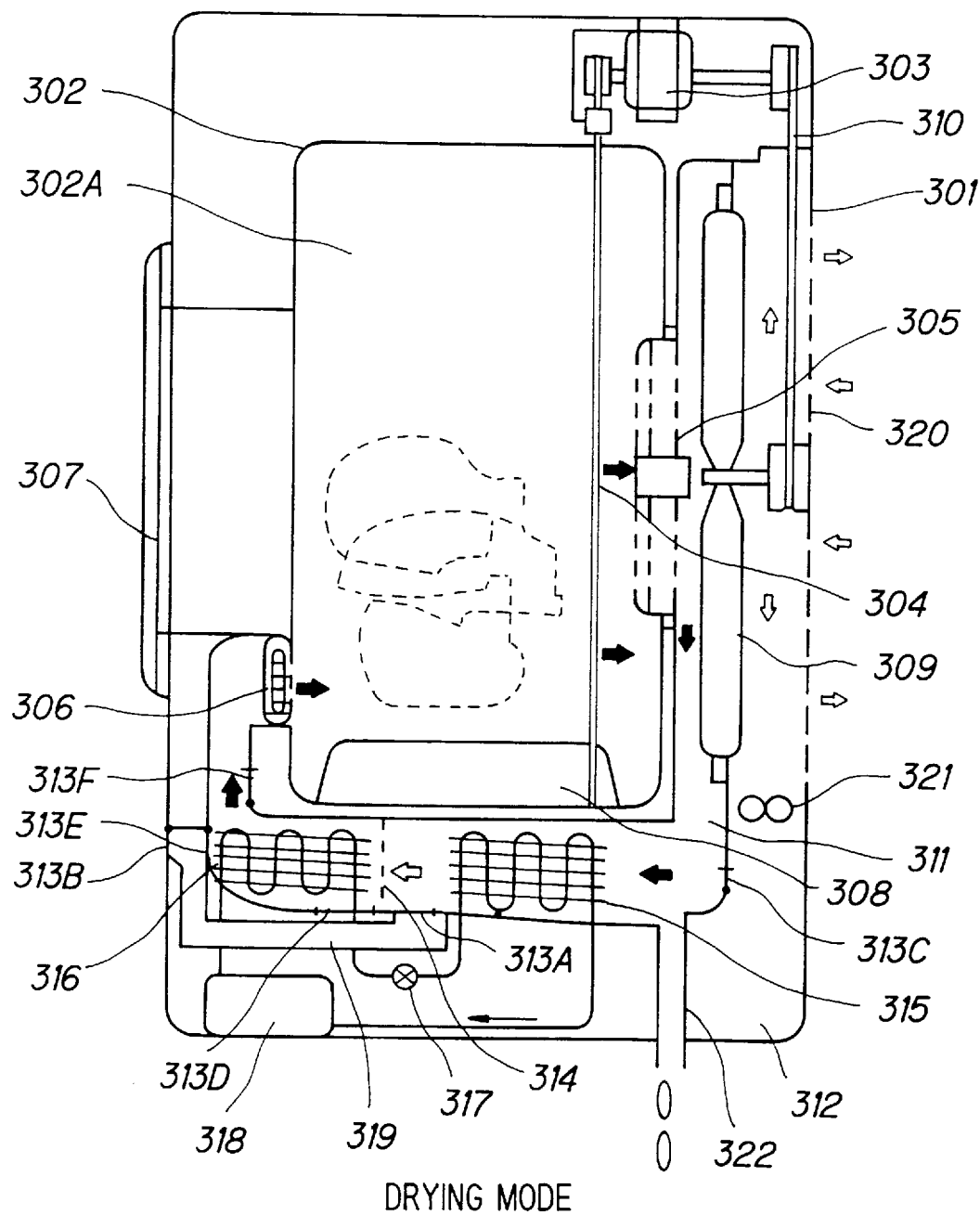
FIG. 20 is a longitudinal sectional side view of a drum type dryer according to the present invention, which is in the drying mode.

FIG. 20 is a longitudinally sectional side view of a drum type dryer according to the present invention.

Referring to FIG. 20, a drum 302 that rotates about a horizontal shaft and has a drying chamber 302A is incorporated in a dryer body 301. A drum-rotating belt 304 is wound on the drum 302 to extend between the drum 302 and a drum-rotating motor 303. When the motor 303 performs a driving operation, the drum 302 is rotated at about 50 to 60 rpm. An exhaust port for exhausting air exhausted in the process of the drying operation is formed in the deep wall of the drum 302. A filter 305 for removing lint and the like that are mixed in the exhaust air is mounted to cover this exhaust port.

A heater 306 serving as the heat source for supplying hot air to the laundry in the drum 302 is provided in the front surface of the drum 302. The heater 306 heats air circulating through a line (to be described later) and supplies it into the drying chamber 302A. The capability of the heater 306 is set to about 1.2 kW which is of a general level for a home clothing dryer. An introduction port 307 for introducing the laundry is formed in the front surface of the drum 302, and a baffle 308 for tumbling the laundry upward is provided in the drum 302.

A fan 309 that takes air in the drying chamber 302A to perform heat exchange is provided on the outer side of the lint removing filter 305 mounted to the deep wall of the drum 302 such that it opposes the filter 305. A rotating force is applied to the fan 309 by a second belt 310 wound on the drum-rotating motor 303, so that the fan 309 rotates together with the drum 302. High-temperature high-humidity air which is taken in and exhausted from the drying chamber 302A by rotation of the fan 309 is heat-exchanged with outer air to an appropriate degree by the heat-exchange function of the fan 309, and is cooled and dehumidified. The air is then sent to a first air circulating line 311 provided to the outer side of the drum 302.

In this embodiment, the dryer body 301 has an air-conditioning function in addition to the clothing drying function. Accordingly, an arrangement for obtaining an air-conditioning function, e.g., cooling, heating, or the like will be described below. Between the dryer body 301 and the drum 302, the first air circulating line 311 is provided on the outer side of the drum 302, and a second air circulating line 312 is provided on the outer side of the first air circulating line 311. The two air circulating lines 311 and 312 are partitioned from each other.

Dampers 313A, 313B, 313C, 313D, 313E, and 313F, a shutter 314, and the like are provided to the respective air circulating lines and the walls of the two air circulating lines. The dampers 313A to 313F, the shutter 314, and the like, switch the flow of air in accordance with the desired function of the dryer body 301, i.e., clothing drying, air-conditioning, or the like. The set positions of the dampers 313A, 313B, 313C, 313D, 313E, and 313F, the shutter 314, and the like, and their opening/closing timings will be described in detail together with the functions to be described below.

As the dryer body 301 has an air-conditioning function, a refrigerating cycle is provided across the first and second air circulating lines 311 and 312. This refrigerating cycle also serves to positively dehumidify and cool the high-temperature high-humidity air in the drying chamber 302A while drying clothing.

Accordingly, cooling/dehumidifying fins 315 are provided midway along the first air circulating line 311 through which the high-temperature high-humidity air taken from the drying chamber 302A passes, and subsequently heating fins 316 are provided midway along the first air circulating line 311 through the partitioning shutter 314. In the second air circulating line 312 located on the outer side of the first air circulating line 311, an expansion valve 317 and a compressor 318 are provided between the heating fan 316 and the cooling/dehumidifying fan 315 and between the cooling/dehumidifying fins 315 and the heating fins 316, respectively. These cooling/dehumidifying fins 315, heating fins 316, expansion valve 317, and compressor 318 are connected to each other with a pipe, thus constituting the refrigerating cycle.

In this refrigerating cycle, the refrigerant compressed by the compressor 318 is condensed into a liquid by the heating fins 316. This liquid is then made into a low-pressure low-temperature liquid by the expansion valve 317, is supplied to the cooling/dehumidifying fins 315, and is then returned to the compressor 318.

The damper 313A is provided on the wall surface of the first air circulating line 311 between the cooling/dehumidifying fins 315 and the heating fins 316. This damper 313A continues to a bypass 319 to supply the cooled dehumidified air to the outside through the damper 313B provided to the front surface of the drier body 301 and serving as an air-conditioning outlet port.

An intake/exhaust port 320 that supplies outer air to the heat-exchange fan 309 and cools the air in the drying chamber 302A by heat exchange is provided to the outer wall near a portion where the heat-exchange fan 309 of the dryer body 301 is provided. This intake/exhaust port 320 continues to the second air circulating line 312. A fan 321 is provided in a position of the second air circulating line 312 which is close to the intake/exhaust port 320. When the fan 321 is driven, the outer air is taken into the air circulating line.

The damper 313C is mounted to the wall of the air circulating line close to the fan 321, and serves to switch the line of air drawn by the fan 321 to either the first or second air circulating line 311 or 312 in accordance with the function of the dryer body 301, i.e., in accordance with whether clothing drying, air-conditioning or the like is to be performed. When the damper 313C is opened, the outer air taken in through the intake/exhaust port 320 flows to the first air circulating line 311.

A drain 322 for discharging water content generated in the dehumidifying process of clothing drying or air-conditioning to the outside is mounted to the wall surface of the first air circulating line 311. The wall surface of the first air circulating line 311 has a slant toward the drain 322 to quickly discharge the water content. Furthermore, regarding the cooling/dehumidifying fins 315, they have a slant on the drain 322 side to quickly remove the generated water content, thereby improving the efficiency of the refrigerating cycle.

The operation of the dryer with the air-conditioning function having the above arrangement will be described. First, a case will be described wherein the high-temperature high-humidity air in the drying chamber 302A is positively dehumidified by utilizing the refrigerating cycle, thereby drying clothing. Upon reception of a clothing drying instruction from an operation panel (not shown) surface, all the dampers 313A to 313C are closed, damper 313F is opened, the shutter 314 is opened, the first air circulating line 311 is separated from the second air circulating line 312, the heater 306 is powered on, and the refrigerating cycle including the motor 303, the compressor 318, and the like is also powered on. Note that the fan 321 is not powered on.

The drum 302 is rotated by the clothing drying instruction, and the heat-exchange fan 309 is also operated to intake air which is heated by the heater 306 and is humidified by the humidity in the drying chamber 302A. Lint is removed from air containing the water content evaporated from the clothing by the filter 305. The air is primarily cooled by the heat-exchange fan 309, and flows through the first air circulating line 311. As the refrigerating cycle is also in the operating state, the primarily cooled air flowing through the first air circulating line 311 is positively cooled and dehumidified by the cooling/dehumidifying fins 315.

Since the shutter 314 is open, the dehumidified air is heated a little by the heating fins 316 as it passes the heating fins 316, is supplied to the heater 306 again, and is utilized for drying the clothing in the drying chamber 302A. The water content generated at the cooling/dehumidifying fin 315 portion is discharged to the outside of the dryer body 301 through the drain 322. When the clothing is to be dried by the operation of the refrigerating cycle without energizing the heater 306, dehumidifying dry operation is performed.

By the above operation, the laundry in the drying chamber 302A is quickly dried with highly dehumidified air in accordance with the operation of the refrigerating cycle. When the refrigerating cycle is not utilized, the laundry is dehumidified by the heat-exchange fan 309 in the same manner as in the conventional dryer, and is dried with hot air heated by the heater 306.

Figure 21:
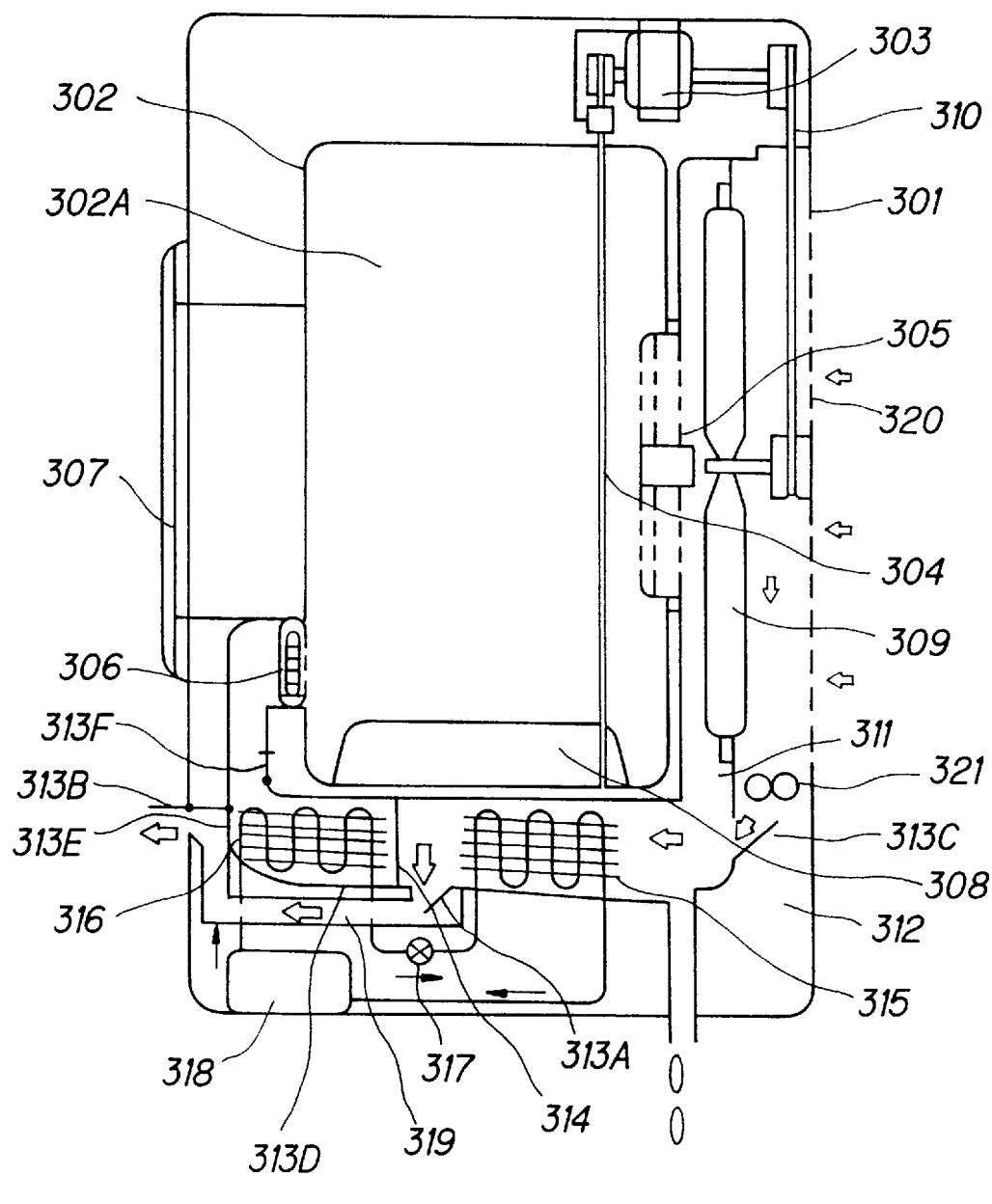
FIG. 21 is a longitudinally sectional side view of the drum type dryer of FIG. 20 in the cooling mode.

The operation of this embodiment will be described by way of a case wherein the dryer is operated with the air-conditioning function, and in particular, the cooling mode. Referring to FIG. 21, in the cooling mode, although the compressor 318 and the fan 321 of the refrigerating cycle are powered on, power is not supplied to the motor 303, and accordingly the drum 302 is not rotated and the clothing drying function is not obtained. Although the shutter 314 and the dampers 313D and 313E maintain the closed state, the dampers 313B, 313C, and 313F are opened.

When the fan 321 is operated, outer air is taken into the second air circulating line 312 through the intake/exhaust port 320 and is guided to the first air circulating line 311 through the open damper 313C. As the first air circulating line 311 is provided with the cooling/dehumidifying fins 315, the taken outer air is brought into contact with the cooling/dehumidifying fins 315 and is cooled.

Although the damper 313A is open, since the shutter 314 is closed, the cooled outer air flows through the bypass 319. As the damper 313E is closed, the cool air does not return to the first air circulating line 311 but is blown to the outside of the dryer body 301 through the damper 313B at the front surface of the dryer body 301. The cool air is discharged to the periphery of the dryer body 301 in this manner.

For example, when the capacity of the compressor 318 is 0.1 kWh and cooling is performed at an efficiency of 70%, the cooling capability is 0.1 (kWh)×0.7×860 (kcal/kWh) =60 (kcal). When the volume of the dressing room is 10 m$^3$ and the room temperature is 30° C., a cooling effect of 60/[10 (m$^3$)×0.24 (kcal/kg°C.)×1.2 (kg/m$^3$)]=20° C. is obtained, and accordingly, the room temperature becomes 10° C.

Figure 22:
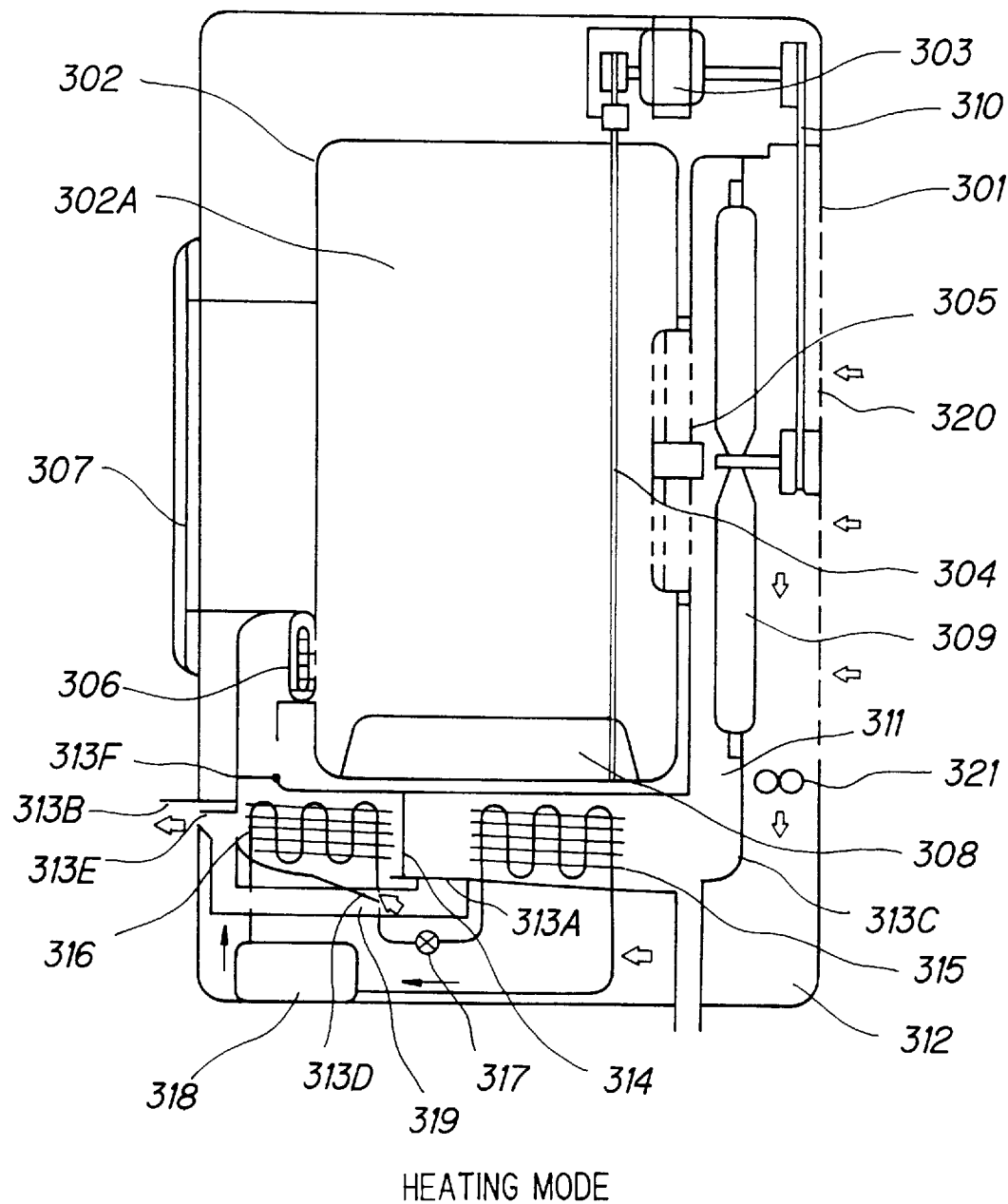
FIG. 22 is a longitudinal sectional side view of the drum type dryer of FIG. 20 in the heating mode.

A case wherein this dryer is operated in the heating mode of the air-conditioning function will be described with reference to FIG. 22. Referring to FIG. 22, in the heating mode, although the compressor 318 and the fan 321 of the refrigerating cycle are powered on in the same manner as in the above cooling mode, power is not supplied to the motor 303, and accordingly the clothing drying function is not obtained. The closed state of the shutter 314 is maintained. Different from the cooling mode, the dampers 313D and 313E are opened while the dampers 313A and 313C are closed.

The damper 313B is open to discharge heated air to the outside of the dryer body 301. As the damper 313F serves to separate the first air circulating line 311 from the heater 306, in the heating mode, it is closed as shown in FIG. 22, thereby preventing the heated air flowing through the first air circulating line 311 from flowing to the drying chamber 302A.

When the fan 321 is operated, the outer air is taken into the second air circulating line 312 through the intake/exhaust port 320 and is guided to the refrigerating cycle portion provided in the second air circulating line 312. The damper 313D is provided at a portion of the wall of the circulating line where the heating fin 316 of the refrigerating cycle is provided. As the damper 313D is open, the taken outer air is immediately heated by the heating fin 316 and is blown from the front surface damper 313B to the outside of the dryer body 301 through the open damper 313E. The hot air is discharged to the periphery of the dryer body 301 in this manner.

Figure 23:
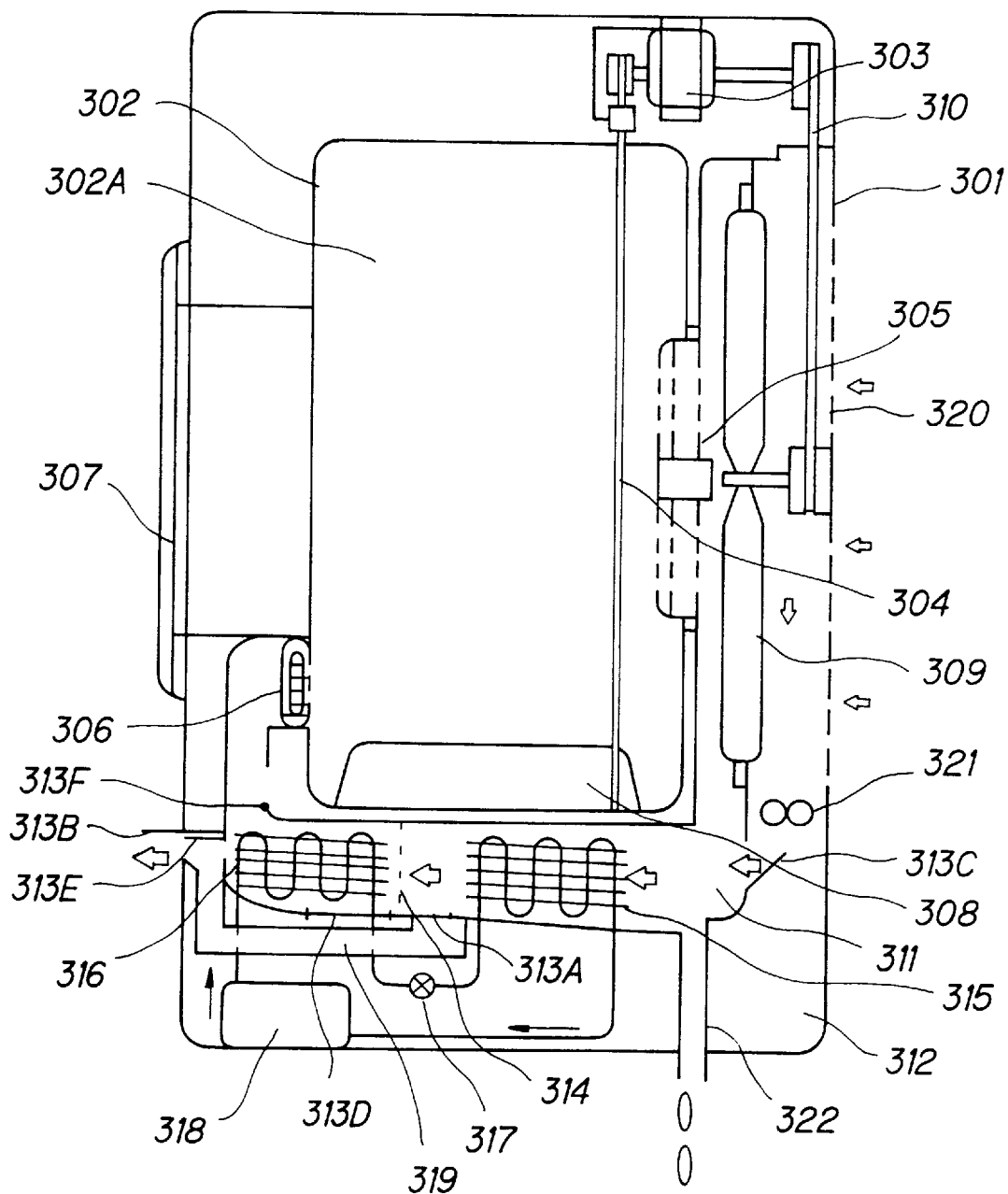
FIG. 23 is a longitudinal sectional side view of the drum type dryer of FIG. 20 in the dehumidifying mode.

A case wherein this dryer is operated in the dehumidifying mode of the air-conditioning function will be described with reference to FIG. 23. Referring to FIG. 23, in the dehumidifying mode, although the compressor 318 and the fan 321 of the refrigerating cycle are powered on in the same manner as in the cooling mode described above, power is not supplied to the motor 303, and accordingly the clothing drying function is not obtained.

Regarding the air circulating line, the dampers 313B, 313E, and 313C are opened while the dampers 313A and 313D are closed, and the shutter 314 midway along the passage is opened, so that the passage communicates from the damper 313C of an outer air suction side to the damper 313B of a front surface. The damper 313F is closed in the same manner as in the heating mode to partition the first air circulating line 311.

The cooling/dehumidifying fins 315 and the heating fins 316 connected to the compressor 318 are located along the air passage. Accordingly, the outer air guided to the first air circulating line 311 from the damper 313C is first cooled and dehumidified by the cooling/dehumidifying fins 315, then is brought into contact with the heating fins 316 to be heated, and thereafter is discharged as dehumidified air from the damper 313B of the front surface to the outside of the dryer body 301.

Figures 24A, 24B:
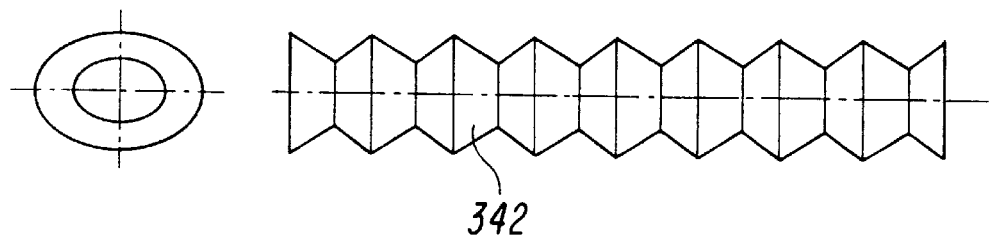
FIGS. 24A and 24B are views of a guide cylinder that can be mounted to an air outlet port formed in the drum type dryer of FIG. 20.
Figures 25A, 25B:
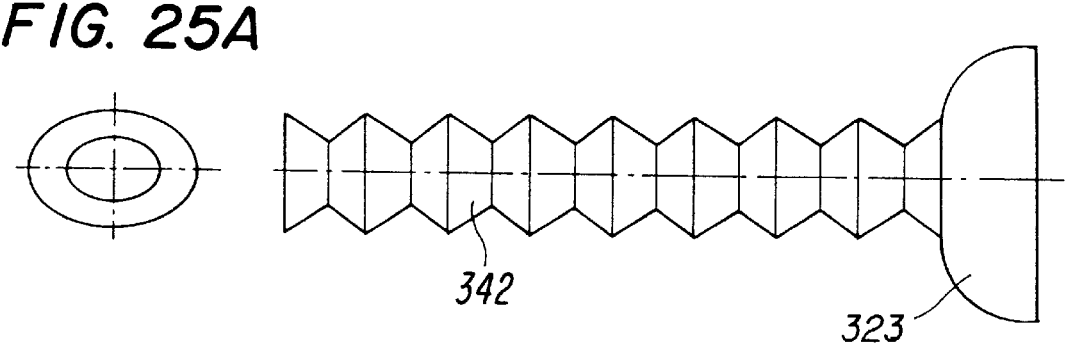
FIGS. 25A and 25B are views showing another practical arrangement of the guide cylinder.

This embodiment has been described by way of a dryer in which air-conditioned air obtained by the operation of the refrigerating cycle is merely discharged to the outside of the dryer body 301 from the damper 313B of the front surface, thereby performing air-conditioning around the dryer. However, a guide cylinder 342 having the shape of a bellows made of a resin, as shown in FIG. 24A and 24B, may be detachably connected to the damper 313B of the front surface, so that cooled air, heated air, or dehumidified air can be locally supplied. Also, as shown in FIG. 25A and 25B, a hair dryer jig or a curl jig 323 to cover the head portion of a human body may be connected to the distal end of the guide cylinder 342, so that the dryer becomes suitable as a hair dryer.

Figure 26:
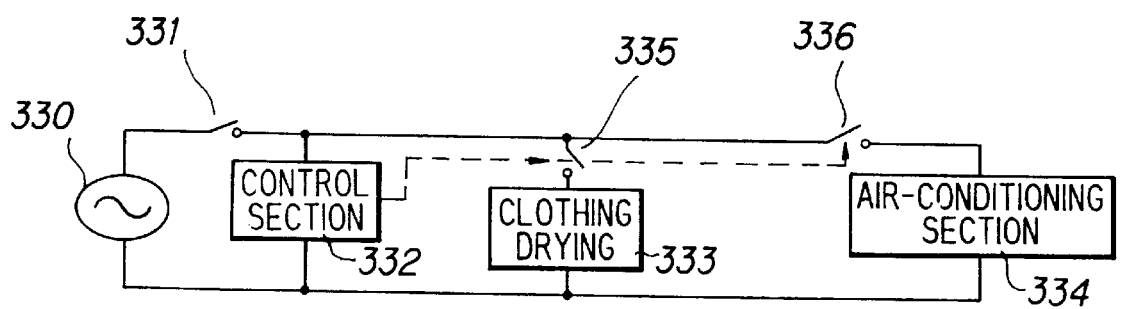
FIG. 26 is a block diagram of a control unit employed in a drum type drier of FIG. 20.

FIG. 26 is a block diagram showing the control circuit of the clothing dryer with the air-conditioning function described above. A commercial power supply 330 is connected to a control section 332, a drive circuit 333 of a clothing drying section, and a drive circuit 334 of an air-conditioning section through a main switch 331. Sub-switches 335 and 336 are further connected between the drive circuit 333 of the clothing drying section, the drive circuit 334 of the air-conditioning section, and the power supply 330. The sub-switches 335 and 336 are turned on/off in accordance with an instruction from the control section 332.

More specifically, the control section 332 determines the operation instruction output from the operation panel, controls the opening/closing operations of the respective dampers and the shutter, determines the necessity of the operation of the compressor in the refrigerating cycle, and turns on/off the sub-switches 335 and 336.

Since the dryer body 301 is originally a clothing dryer, when the power switch is turned on, the control section 332 sets the positions of the respective dampers and the shutter so that the dryer serves as an ordinary clothing dryer, i.e., as a heated hot air drier in the clothing drying mode described above in which the refrigerating cycle does not operate.

Figure 27:
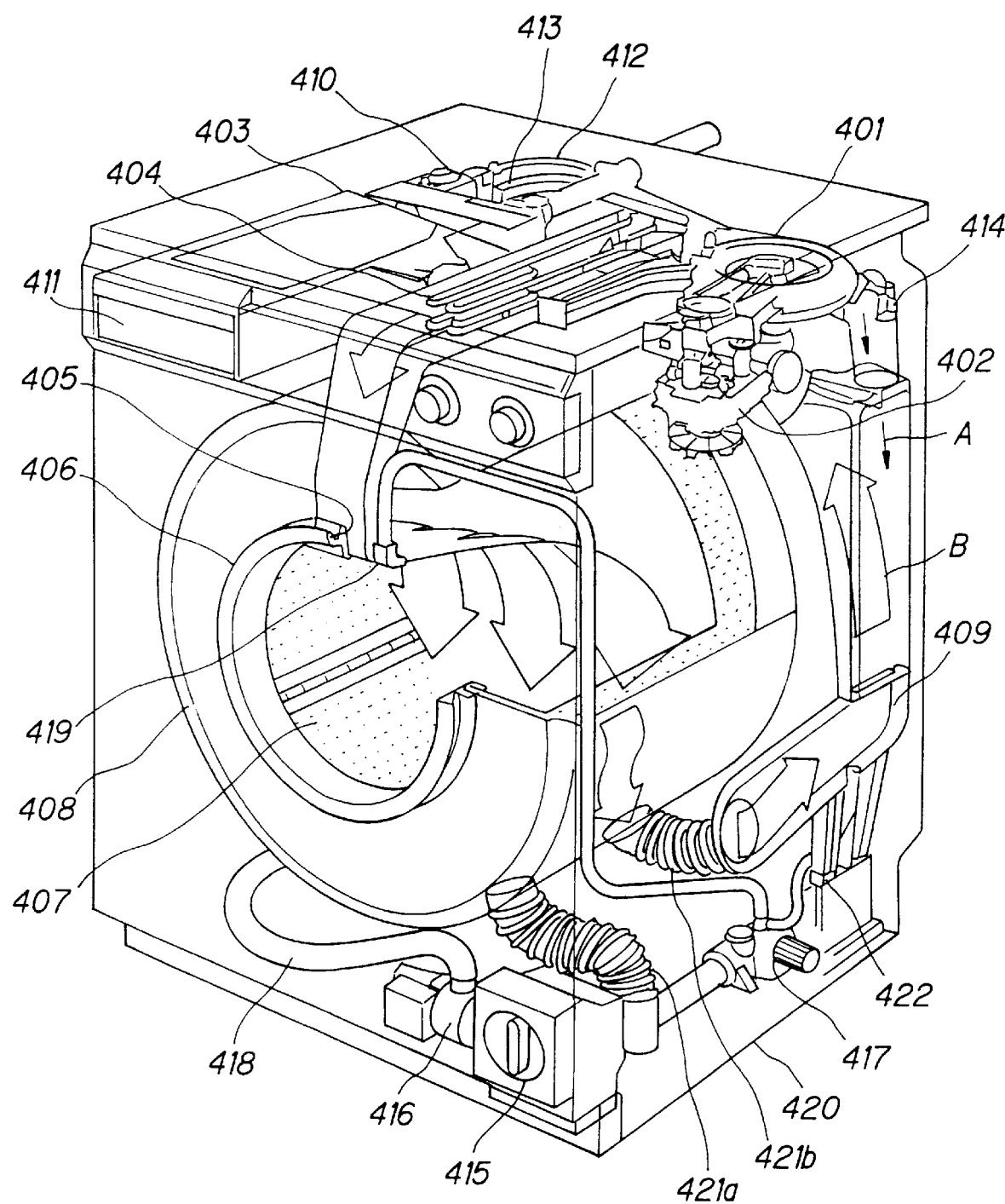
FIG. 27 is a perspective view of a drum type washing machine according to the fifth embodiment of the present invention.

FIG. 27 is a perspective view showing a drum type washing machine according to the fifth embodiment of the present invention. Referring to FIG. 27, reference numeral 401 denotes a fan; 402, a motor; 403, a duct; 404, a drying heater; 405, a hot air supply port; 406, a sealer; 407, a drum; 408, a water tank; 409, a duct; 410, a water supply valve; 411, a detergent introduction port; 412, a condensing branch hose; 413, a water-cooling dehumidifying hose; 414, a check valve; 415, a filter; 416, a water discharge pump; 417, a circulating pump; 418, a water discharge hose; 419, a nozzle; 420, a drier/washing machine body; and 421*a*, 421*b*, and 422, bellows hoses, respectively. More specifically, the drum type washing machine of this embodiment has a drying function.

A drum-rotating belt which obtains a rotating force from a drum-rotating motor is wound on the drum-rotating pulley of the drum 407 that accommodates laundry and rotates. The drum 407 is rotated at about 50 to 60 rpm for washing and drying and at 1,000 rpm for dehydration. The water tank 408 is mounted outside the drum 407 so that water does not leak. The sealer 406 for eliminating water leakage between the laundry introduction port and the drum 407 is provided to the front surface of the drum 407. The bellows hose 421*a* which is used for circulating the discharge water and washing water and the bellows hose 421*b* which is used for circulating the dry air are mounted to the water tank 408.

The bellows hose 421*a* used for circulation of the discharge water and washing water is provided with the filter 415 which is used for removing the lint and dust mixed in water. The discharge pump 416 and the discharge hose 418 used for discharging and dehydrating the washing water are mounted to one side of the filter 415. The circulating pump 417 and the nozzle 419 used for circulating the washing water during washing are mounted to the other side of the filter 415, so that the washing water can be forcibly sprayed to the laundry.

The duct 409, the fan 401, the duct 403, and the hot air supply port 405 are connected to the bellows hose 421*b* which is used for circulating the dry air. In the duct 409, low-temperature high-humidity air, which is heat-exchanged, condensed, and then heat-exchanged between the circulating air (indicated by a hollow arrow B) that dries the laundry and water (indicated by a black arrow A)

supplied from the water-cooling dehumidifying hose 413, circulates such that it is drawn by the fan 401 rotated by the motor 402, is heated to about 120° C. by the drying heater 404 located in the duct 403, is supplied into the drum 407 again through the hot air supply port 405, and evaporates the water content from the laundry.

Water condensed in the duct 409 flows through the bellows hose 422 and is discharged from the discharge hose 418 by the force of the discharge pump 416. In FIG. 27, although reference numeral 410 denotes the water supply valve for supplying tap water; 411, the detergent introduction port; 412, the condensing branch hose; and 414, the check valve, respectively, a description of these components will be omitted here.

The operation of this drum type washing machine will be described below. The laundry is loaded through the laundry introduction port located in the front surface of the sealer 406 that eliminates water leakage, a detergent suitable for the laundry is placed in the detergent introduction port 411, and the start button is depressed. Then, water corresponding in amount to the laundry flows through the water supply valve 410 and is supplied to the drum 407 as it dissolves the detergent placed in the detergent introduction port 411.

The drum 407 is rotated to wash the laundry by patting. The washing water passes through the bellows hose 421a, the filter 415, and the circulating pump 417, and is supplied into the drum 407 again through the nozzle 419. This operation is repeatedly performed to perform washing. When the washing operation is finished, the washing water passes through the bellows hose 421a, the filter 415, and the discharge pump 416, and is discharged through the discharge hose 418. Thereafter, the laundry is dehydrated of water remaining in it by rotating the drum 407 at a high speed. Water obtained by dehydration is discharged along the same passage as described above.

After the washing operation, fresh water is supplied from the water supply valve 410 to the drum 407 through the detergent introduction port 411. The rinsing operation progresses with the same passage as in the washing operation. Dehydration after the rinsing operation also progresses in the same manner. The washing water and rinsing water entering the duct 409 from the bellows hose 421b pass through the hose 422 connected to the lower hole of the duct 409, the circulating pump 417, the filter 415, and the discharge pump 416, and is discharged from the discharge hose 418 with the aid of the discharge pump 416.

Figure 28:
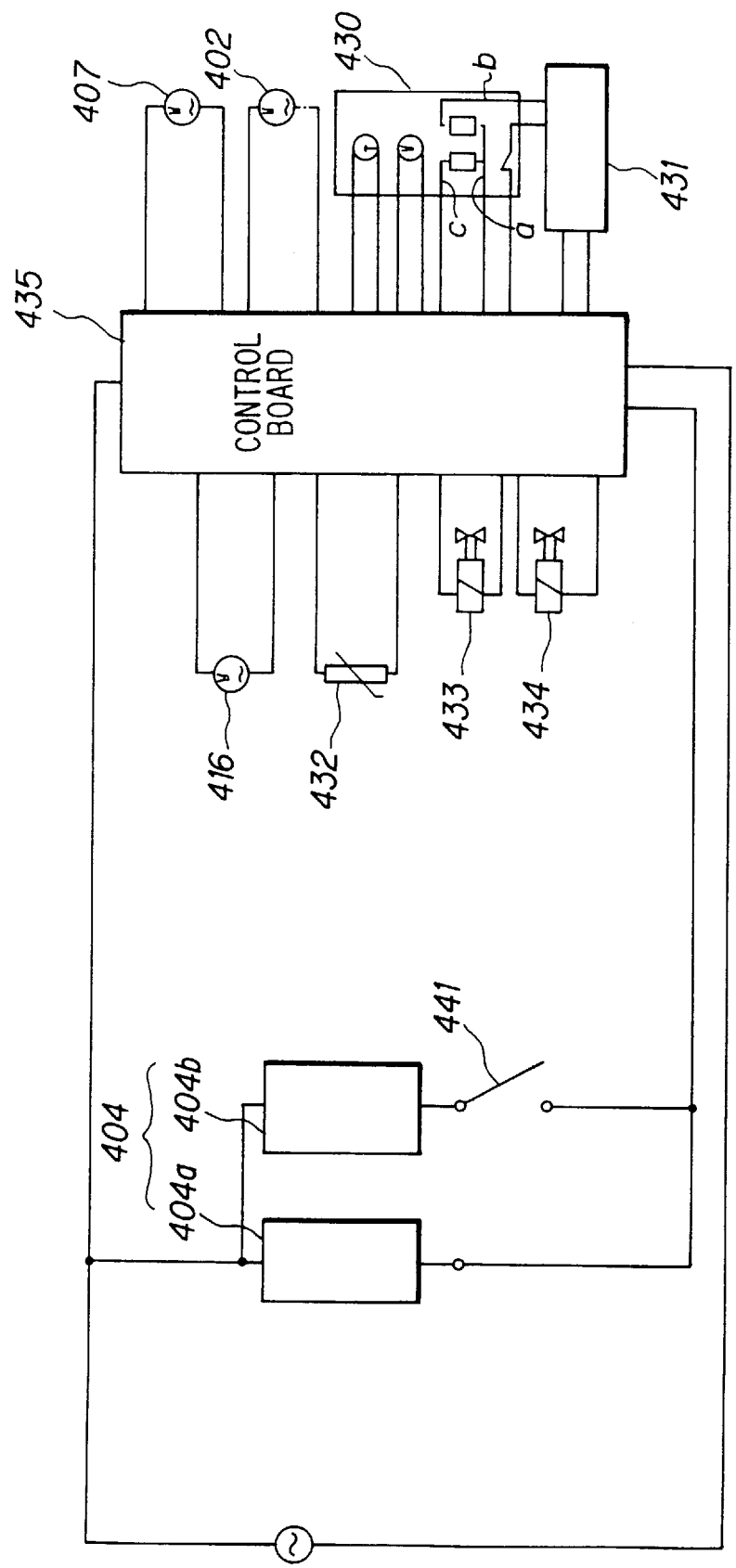
FIG. 28 is a block diagram of a control unit employed in the drum type washing machine according to the fifth embodiment.

To dry the laundry that has been dehydrated, first, the fan 401 is operated, and the drying heater 404 is heated with the power of 1,200 W while rotating the drum 407 at 50 rpm (b and c of the main motor 430 of FIG. 28). The obtained hot air is blown into the drum 407 through the hot air supply port 405. When about 5 minutes have elapsed, a heater switch 441 in FIG. 28 is turned off with a circuit as shown in FIG. 28, thus decreasing the output of the drying heater 404 to 700 W. Then, the drum 407 is rotated at a high speed of about 1,000 rpm (a and b of the main motor of FIG. 28) for about 10 minutes.

Figure 29:
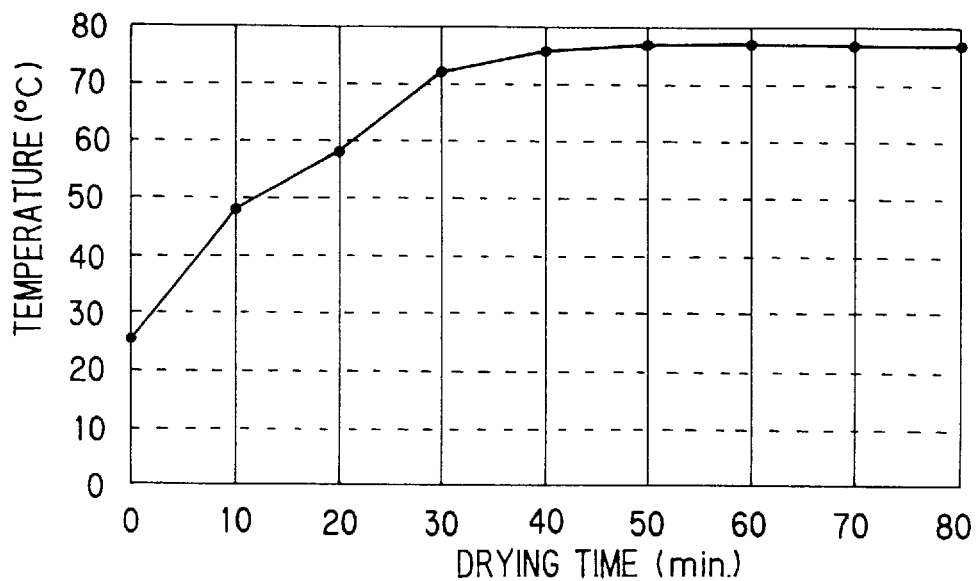
FIG. 29 is a graph showing the relationship between the surface temperature of laundry and drying time.
Figure 30:
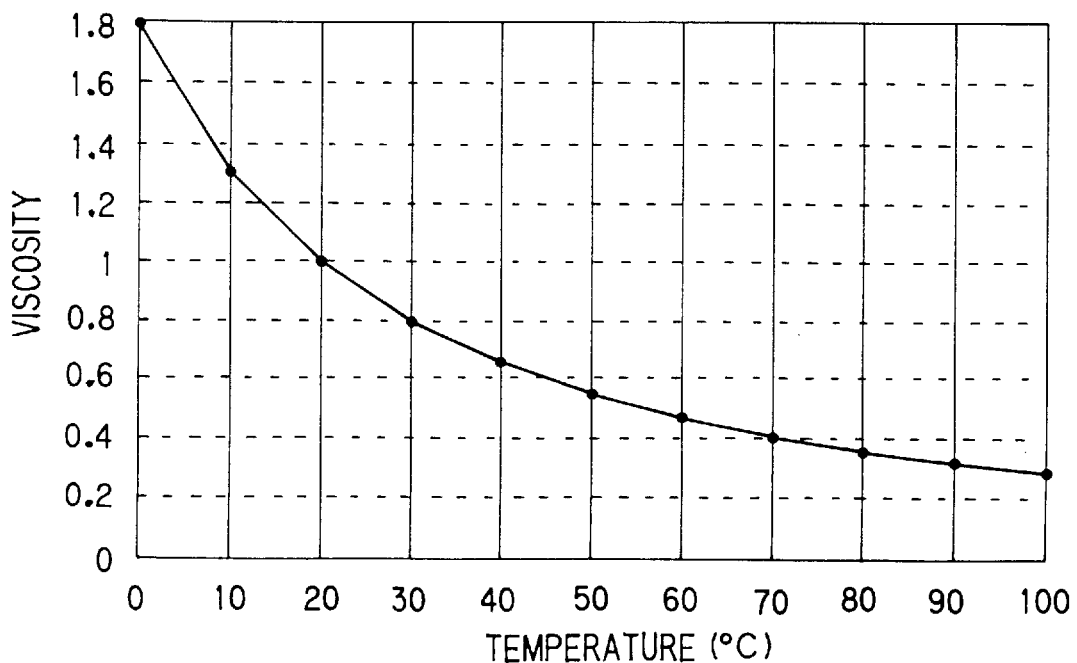
FIG. 30 is a graph showing the relationship between the viscosity and temperature of water.

In this case, as shown in the graph of FIG. 30, the higher the temperature of water, the lower the viscosity of water. In a graph of FIG. 29 showing a change in the surface temperature of laundry with a drying time of 5 to 15 minutes, since the laundry is heated to about 40° C., it is dehydrated of about 100 g of water by high-speed dehydration. All water obtained by dehydration, water used for water cooling, and water evaporated from the laundry and condensed flow through the hose 422, the circulating pump 417, the filter 415, and the discharge pump 416 from the duct 409, and are discharged from the discharge hose 418 by the operation of the discharge pump 416.

When the drum 407 is rotated at a high speed of 1,000 rpm, the laundry sticks to the inner circumferential surface of the drum 407. Thus, after the high-speed rotation, the drum 407 is temporarily stopped, and is rotated in the reverse direction at about 50 rpm by the operation of a rectifying board. Then, the laundry stuck to the drum 407 gathers to the lower portion of the drum 407 and is rotated again along with the low-speed rotation of the drum 407. This operation is continued until the drying operation ends.

In accordance with this method, the conventional drying time of about 45 minutes per kg can be shortened to about 40 minutes, resulting in the reduction of the drying time of about 10%.

Referring to FIG. 28, the drying heater 404 is constituted by a 700-W drying heater 404a and a 500-W drying heater 404b. Reference numeral 430 denotes a main motor for rotating the drum 407; 431, a rectifying board having a rectifying circuit; 432, a drying temperature sensor; 433, a water supply valve for washing; 434, a water supply valve for drying; and 435, a control board having a microcomputer and the like.

Finally, in place of the water-cooling dehumidifying unit described in this embodiment, the dehumidifying unit of the refrigerating cycle shown in FIG. 20 may be utilized in the drum type washing machine of this embodiment. More specifically, the water-cooling dehumidifying unit of this embodiment comprising the duct 409, the water-cooling dehumidifying hose 413, and the duct 403 may be replaced with the dehumidifying unit of a refrigerating cycle shown in FIG. 20 comprising the first air circulating line 311, the dampers 313, the shutter 314, the cooling/dehumidifying fins 315, the heating fins 316, the expansion valve 317, the compressor 318, and the bypass 319.

What is claimed is:

1. A drum type washing machine comprising:

a drum for accommodating laundry, said drum having a plurality of holes and a baffle for tumbling the laundry at a circumferential wall thereof;

a water tank for supporting said drum to be rotatable about a horizontal shaft, said water tank surrounding said drum entirely;

a drive unit for applying a driving force of forward/reverse rotation to said drum;

vibration-detecting means for detecting vibration of said water tank;

decision means for determining the amplitude of vibration detected by said vibration-detecting means at a predetermined low rotation speed at which vibration is substantially proportional to vibration of said drum at high-speed rotation; and control means for controlling said drive unit, based on the amplitude of the vibration, to correct localization of the laundry in said drum by changing rotation direction of said drum.

2. The drum type washing machine according to claim 1, wherein when the amplitude of the vibration determined by said decision means at the predetermined low rotation speed at which the vibration is substantially proportional to vibration of said drum in high-speed rotation is a predetermined value or less, said control means controls said drive unit to rotate said drum at a higher speed.

3. The drum type washing machine according to claim 1, wherein when the amplitude of the vibration determined by said decision means exceeds a predetermined value at any rotation speed not more than the predetermined low rotation speed, said control means controls said drive unit to temporarily stop rotation of said drum and then to rotate said drum in a reverse direction so that localization of the laundry is corrected, and when the amplitude of the vibration determined by said decision means exceeds a vibration limit value at any rotation speed including that of high-speed rotation, said control means controls said drive unit to temporarily stop rotation of said drum so that localization of the laundry is corrected.

4. A drum type washing machine according to claim 3, wherein after said control means controls said drive unit to temporarily stop rotation of said drum, said drum is rotated in the reverse rotation direction at a low speed of about 50 to 65 rpm for 1 to 3 seconds to correct localization of the laundry, and then said drum is accelerated to the predetermined low rotation speed, and when the amplitude of the vibration determined by said decision means is the predetermined value or less, said control means controls said drive unit to rotate said drum at a higher speed.

5. The drum type washing machine according to claim 1, wherein said vibration-detecting means comprises a vibration sensor which is provided for said water tank and which detects a horizontal or vertical component of vibration occurring in the rotational direction of said drum.

6. The drum type washing machine according to claim 1, wherein said drum has a liquid balancer in which a high-boiling viscous liquid is sealed.

7. The drum type washing machine according to claim 6, wherein the viscous liquid is glycerin or a diluted glycerin solution.

8. The drum type washing machine according to claim 6, wherein the viscous liquid is injected and sealed in said liquid balancer under reduced pressure.

9. The drum type washing machine according to claim 8, wherein the viscous liquid is injected and sealed in said liquid balancer such that, assuming that an internal pressure of said liquid balancer at a high temperature satisfies (atmospheric pressure+$P_1$), the internal pressure of said liquid balancer at room temperature satisfies (atmospheric pressure−$P_1$), wherein $P_1$ is a vapor pressure of the viscous liquid.

10. The drum type washing machine according to claim 1, wherein said control means controls said drive unit to decrease a rotation speed of said drum to a low speed of about 50 to 65 rpm for 1 to 3 seconds to correct localization of the laundry, and then said drum is accelerated to the predetermined low rotation speed, and when the amplitude of the vibration determine by said decision means is the predetermined value or less, said control means controls said drive unit to rotate said drum at a higher speed.

11. A drum type washing machine comprising:
a drum for accommodating laundry, said drum having a plurality of holes and a baffle for tumbling the laundry at a circumferential wall thereof;
a water tank for supporting said drum to be rotatable about a horizontal shaft, said water tank surrounding said drum entirely;
a drive unit for applying a driving force of forward/reverse rotation to said drum;
vibration-detecting means for detecting vibration of said water tank;
decision means for determining the amplitude of vibration detected by said vibration-detecting means at a predetermined low rotation speed at which vibration is substantially proportional to vibration of said drum at high-speed rotation; and
control means for controlling said drive unit to correct localization of the laundry in said drum such that when the amplitude of the vibration determined by said decision means at the predetermined low rotation speed at which the vibration is substantially proportional to vibration of said drum in high-speed rotation is a predetermined value or less, said control means controls said drive unit to rotate said drum at a higher speed.

12. A drum type washing machine comprising:
a drum for accommodating laundry, said drum having a plurality of holes and a baffle for tumbling the laundry at a circumferential wall thereof;
a water tank for supporting said drum to be rotatable about a horizontal shaft, said water tank surrounding said drum entirely;
a drive unit for applying a driving force of forward/reverse rotation to said drum;
vibration-detecting means for detecting vibration of said water tank;
decision means for determining the amplitude of vibration detected by said vibration-detecting means at a predetermined low rotation speed at which vibration is substantially proportional to vibration of said drum at high-speed rotation; and
control means for controlling said drive unit to correct localization of the laundry in said drum such that when the amplitude of the vibration determined by said decision means exceeds a predetermined value at any rotation speed not more than the predetermined low rotation speed, said control means controls said drive unit to temporarily stop rotation of said drum and then to rotate said drum in a reverse rotation direction so that localization of the laundry is corrected, and when the amplitude of the vibration decided by said decision means exceeds a vibration limit value at any rotation speed including that of high-speed rotation, said control means controls said drive unit to temporarily stop rotation of said drum so that localization of the laundry is corrected.

13. A method of correcting localization of laundry in a washing machine, the washing machine having a drum for accommodating the laundry and a water tank for supporting the drum to be rotatable, the method comprising the steps of:
a) driving the drum in a first rotational direction at a predetermined low rotational speed;
b) determining if vibration of the water tank during rotation of the drum in the first rotational direction is less than or equal to a first predetermined value;
c) driving the drum in a second rotational direction at the predetermined low rotational speed upon determination in said step b) that the vibration is greater than the first predetermined value;
d) determining if vibration of the water tank during rotation of the drum in the second rotational direction is less than or equal to the first predetermined value; and
e) driving the drum in the second rotational direction at a predetermined high rotational speed upon determination in said step d) that the vibration is equal to or less than the first predetermined value.

14. The method of correcting the localization of laundry of claim 13, comprising the further step of:
f) driving the drum in the first rotational direction at the predetermined high rotational speed upon determination in said step b) that the vibration is less than or equal to the first predetermined value.

15. The method of correcting the localization of laundry of claim 14, comprising the further steps of:
   g) determining if vibration of the water tank during rotation of the drum in the first rotational direction at the predetermined high rotational speed is less than or equal to a second predetermined value; and
   h) driving the drum in the second rotational direction at the predetermined low rotational speed upon determination in said step g) that the vibration is greater than the second predetermined value.

16. The method of correcting localization of laundry of claim 13, wherein said step c) comprises driving the drum in the second rotational direction upon determination in said step b) that the vibration is greater than the first predetermined value for any rotational speed less than or equal to the predetermined low rotational speed.

17. The method of correcting localization of laundry of claim 13, further comprising the step of:
   f) driving the drum in the first rotational direction at the predetermined low rotational speed upon determination in said step d) that the vibration is greater than the first predetermined value.

18. The method of correcting localization of laundry of claim 13, wherein said steps a), c) and e) comprise driving the drum about a horizontal axis.

19. The method of correcting localization of laundry of claim 13, wherein said steps b) and d) comprise detecting vibration of the water tank using a piezoelectric sensor.

20. A washing machine comprising:
   a drum for accommodating laundry;
   a water tank for supporting said drum to be rotatable;
   driving means for driving said drum in opposite first and second rotational directions;
   vibration means for detecting vibration of said water tank during rotation of said drum; and
   control means for controlling said driving means to drive said drum at predetermined low and high rotational speeds in the first and second rotational directions and for comparing detected vibration to a first predetermined value,
   said control means controlling said drive means to drive said drum in the first rotational direction at the predetermined low rotational speed, to drive said drum in the second rotational direction at the predetermined low rotational speed upon determination that the detected vibration during rotation of said drum in the first rotational direction is greater than the first predetermined value, and to drive said drum in the second rotational direction at the predetermined high rotational speed upon determination that the detected vibration during rotation of said drum in the second rotational direction is less than or equal to the first predetermined value.

21. The washing machine of claim 20, wherein said control means further controls said drive means to drive said drum in the first rotational direction at the predetermined high rotational speed upon determination that the detected vibration during rotation of said drum in the first rotational direction is less than or equal to the first predetermined value.

22. The washing machine of claim 21, wherein said control means further controls said drive means to drive said drum in the second rotational direction at the predetermined low rotational speed upon determination that the detected vibration during rotation of said drum in the first rotational direction at the predetermined high rotational speed is greater than a second predetermined value.

23. The washing machine of claim 20, wherein said control means controls said drive means to drive said drum in the second rotational direction at the predetermined low rotational speed upon determination that the detected vibration of said drum during rotation in the first rotational direction is greater than the first predetermined value for any rotational speed less than or equal to the predetermined low rotational speed.

24. The washing machine of claim 20, wherein said control means controls said drive means to drive said drum in the first rotational direction at the predetermined low rotational speed upon determination that the detected vibration of said drum during rotation in the second rotational direction at the predetermined low rotational speed is greater than the first predetermined value.

25. The washing machine of claim 20, wherein said drive means rotates said drum about a horizontal axis.

26. A washing machine comprising:
   a drum for accommodating laundry;
   a water tank for supporting said drum to be rotatable;
   driving means for driving said drum in opposite first and second directions;
   vibration means for detecting vibration of said drum during rotation;
   control means for controlling said drive means to correct localization of the laundry in accordance with the detected vibration; and
   a liquid balancer, mounted on said drum, having a viscous liquid injected and sealed therein such that, assuming that an internal pressure of said liquid balancer at a high temperature satisfies (atmospheric pressure+$P_1$), the internal pressure of said liquid balancer at room temperature satisfies (atmospheric pressure−$P_1$), wherein $P_1$ is a vapor pressure of the viscous liquid.

27. The washing machine of claim 26, wherein the viscous liquid is a high-boiling viscous liquid.

28. The washing machine of claim 26, wherein the viscous liquid is glycerin or diluted glycerin.

29. A drum type washing machine comprising:
   a drum for accommodating laundry, said drum having a plurality of holes and a baffle for tumbling the laundry at a circumferential wall thereof;
   a water tank for supporting said drum to be rotatable about a horizontal shaft, said water tank surrounding said drum entirely;
   a drive unit for applying a driving force of forward/reverse rotation to said drum;
   a liquid balancer, mounted on said drum, having a glycerin solution therein;
   vibration-detecting means for detecting vibration of said water tank;
   decision means for determining the amplitude of vibration detected by said vibration-detecting means at a predetermined low rotation speed at which vibration is substantially proportional to vibration of said drum at high-speed rotation; and
   control means for controlling said drive unit, based on the amplitude of the vibration, to correct localization of the laundry in said drum by changing rotation direction of said drum.

* * * * *